(12) United States Patent
Chernyak et al.

(10) Patent No.: US 7,103,434 B2
(45) Date of Patent: Sep. 5, 2006

(54) PLM-SUPPORTIVE CAD-CAM TOOL FOR INTEROPERATIVE ELECTRICAL AND MECHANICAL DESIGN FOR HARDWARE ELECTRICAL SYSTEMS

(76) Inventors: Alex H. Chernyak, 2190-31 Ave., San Francisco, CA (US) 94116; Benjamin Gelman, 1049 Peppermill Ct., Concord, CA (US) 94518; Michael Savransky, 5011 Raven Way, Clayton, CA (US) 94517; Yanush Cherkis, 403 Main St. #116, San Francisco, CA (US) 94105

( * ) Notice: Subject to any disclaimer, the term of this patent is extended or adjusted under 35 U.S.C. 154(b) by 2 days.

(21) Appl. No.: 10/686,090

(22) Filed: Oct. 14, 2003

(65) Prior Publication Data
US 2005/0080502 A1   Apr. 14, 2005

(51) Int. Cl.
*G06F 19/00* (2006.01)
(52) U.S. Cl. .................... 700/98; 700/97; 700/103; 700/107
(58) Field of Classification Search ................ 700/95, 700/96, 97, 103, 105, 106, 107, 98
See application file for complete search history.

(56) References Cited

U.S. PATENT DOCUMENTS

| | | | |
|---|---|---|---|
| 4,638,442 A | 1/1987 | Bryant et al. | |
| 4,862,376 A * | 8/1989 | Ferriter et al. | 700/107 |
| 4,875,162 A | 10/1989 | Ferriter et al. | |
| 4,912,657 A * | 3/1990 | Saxton et al. | 715/853 |
| 5,822,206 A | 10/1998 | Sebastian et al. | |
| 2002/0156757 A1 * | 10/2002 | Brown | 707/1 |

* cited by examiner

*Primary Examiner*—Leo Picard
*Assistant Examiner*—Michael D. Masinick
(74) *Attorney, Agent, or Firm*—George S. Cole

(57) ABSTRACT

This invention is a tool for computer-aided design, computer-aided manufacturing forming a Project Management System, comprising: (1) a Component Database; (2) a Component Data Management System; (3) a Design and Manufacturing System; (4) an Assembly Drawing Generator; (5) a Bill of Materials Generator; and, (7) a Project Database. The Project Manager tracks the process and actions, recording and supervising version and change order compliance and task completion, from the start through verification of a production-ready finished version. Each project uses a master workbench. On it design specifications are entered for each subassembly element and connector. Then the user consults the Component Database using a Search and Cross Reference engine for components meeting those design specifications, until a constraint-satisfying design is completed. The tool generates a Bill of Materials, Assembly Drawings, and process records for the project in process.

42 Claims, 6 Drawing Sheets

PLM-SUPPORTIVE CAD-CAM TOOL FOR INTEROPERATIVE ELECTRICAL AND MECHANICAL DESIGN FOR HARDWARE ELECTRICAL SYSTEMS

BACKGROUND OF THE INVENTION

In the past score of years Computer-Aided Design (CAD) and Computer-Aided Manufacturing (CAM) tools have been created; some for particular manufactured components (such as a computer chip), some for complex components which incorporate sub-assemblies of electrical components (such as printed circuit boards, computer motherboards or power supplies), and some for discrete pin-to-pin interconnections between separate electrical component circuits. Extremely powerful and elaborate tools have also been created for individual semiconductor-based, integrated-circuit chips' logic circuit design, layout, and manufacturing; similarly, powerful, three-dimensional visualization, rendering, and supportive tools for designing complex-shaped mechanical parts and assemblies have been created. Companies now focus on increasing the density and complexity of particular manufactured components to increase the value-added aspect of their business.

Most of these tools, if not all, have focused on either the logical/electrical aspect, or on the physical/analog aspect, of their subject matter. Most tools in the prior art have focused on particular components rather than the entirety of an assemblage; and most have focused on support for designing from scratch, rather than building from already-available, 'off-the-shelf' manufacturers' products and components.

Over the same time, manufacturers have created many different components. For example, consider the class comprising connectors which are used to link together electronic and mechanical components into a completed product. In the computer field alone there are connectors for parallel, serial, Ethernet, FireWire, SCSI, USB, DIN-9, DIN-25, and other possible connection standards, with each of these connection-standard categories further subdividing into connectors with differing lengths, pin assignments and layouts, resistances, shielding, and other properties, all on the market.

Connection is an essential part of any complex assemblage process, including and more particularly electromechanical assemblies and electronic devices (which hereafter will be referred to as "Hardware Electrical Systems", or "HES"). For each such HES, a multiplicity of connectors bridge and connect the subordinate, disparate component parts and sub-assemblies into a greater whole. But as the density and complexity of incorporated components increase, so, too, does the complexity of their interconnections—and thus the complexity of the connectors which are required to bring them together, so that each whole HES becomes more than just an agglomeration of the parts. What used to be accomplished with simple 16-gauge wires hand-soldered into place now requires complex connectors; and what could be done with simple line drawings now requires systemic design responsive to the precise environment throughout the entirety of the physical, finished product. Connector design, alone, has become its own subordinate engineering specialty!

But connectors are only a part of the greater problem of integrating electrical and mechanical system design. ('Mechanical', in this sense, addresses the physical but non-electrical aspects such as dimensionality, temperature tolerance, strain/stress/flexibility, color, or other characteristics of a component. And non-electrical is meant to exclude only the intentionally electrical aspects of a component, i.e. those aspects affecting the electrical functioning by design as opposed to mishap.) For most 'hardware', in these days of increasingly pervasive electronics, both electrical and mechanical design aspects must be considered and resolved. This is universally true for any HES.

For any HES, both the electrical and mechanical aspects must interoperate, and both the logical and physical details must be correct. All the specific details from count, pin assignment, pin placement, pin resistance, cable length, cable flexibility, cable diameter, to each component's physical, electrical, and logical specifications—all these must be integrated in the real world, or a device will not function (at worst) or will contain unsuspected flaws or weaknesses. All these concerns must also increasingly be integrated in the symbolic design world, when a new product is proposed or considered; and success and efficiency in such is required to move from conception to design to manufacturing to market. Moreover, as companies increasingly strive to produce multiple products and manage these products' lifecycles (design, stocking, inventory, engineering change orders ("ECO") responsive to customers' requests, version tracking), the need for supportive tools to manage the process effectively has increased.

It should be reasonably understood that any particular HES may be considered at the top level of granularity to be a single product. That product is comprised of a set of components, and both the nature of interaction and interconnection (physical and electrical) amongst the members of the set of components, and the particulars of each member's composition, must be tracked. Each member of this set of components can be viewed in turn as a sub-assembly to the entire product, comprising in its turn a set of parts and interconnections. This recursive evaluation can arbitrarily bottom out at the level where the designer of the top-level product decides it is more efficient to treat an assembly as an atomistic element or part which is more efficient to obtain as defined from an external support.

For example, one manufacturer, with less sophisticated personnel, may simply put a computer together from the motherboard, power source, cabling, shell, drive(s), peripheral-support secondary components, and superficial styling components, using nothing more complex than solder, screwdriver, and sweat. A second manufacturer may want to provide a more specialized, or at least more particularized, computer by incorporating a drive which it manufactures itself to obtain an advantage in performance, cost, or quality. A third may wish to put together its own motherboards, using a varying chipset and PCB selection depending on market availability. The first manufacturer will consider its computer to be the project, and every one of the subordinate components to be an 'atom' which it conjoins. The second manufacturer will also consider its computer to be the project, but will have a sub-project (or sub-assembly) for the in-house drive component. The third computer will also consider its computer to be the project, but its drive will be atomistic, while the motherboard will be a sub-assembly. Each manufacturer will want to focus its limited-resource of skilled design engineer and design management time and attention differently; none will want to bear the burden of tracking and entering excess particularity.

To keep up with the continually increasing flow of innovations, choices, and changes, while decreasing their own costs, manufacturers increasingly must reduce the cost of labor used in designing, not just manufacturing, their products. For cost reasons, most manufacturers, particularly end-product, more particularly mass-market consumer product, and most particularly consumer electronic product manufacturers, would prefer to use standardized and pre-existing components (each one representing a solution) from established vendors, over reinventing and manufacturing every component in each subassembly from scratch. This approach also greatly facilitates coordination of manufacturing over multiple products, including multiple product versions and multiple product lines.

In the existing state of the art, both Product Lifecycle Management ("PLM") and HES design for manufacturability take place in a manual, error-prone environment. Currently the design and production engineers must collect an enormous variety and quantity of information. They must gather all the relevant details from manufacturers of the subcomponents, a time-consuming process in itself; compare and contrast amongst various candidate components and each against the design specification's constraints; and, generally, conduct a search and comparison effort for parts availability and suitability using improvised tools, memory, and both on-line and off-line catalogs. These tasks are made more difficult by the fact that some manufacturers, to prevent ready comparison, pointedly differentiate the amount and nature of the details they publish about their components; there is no global standard.

Companies need tools that support more than just the design of each HES (and its subordinate components, sub-assemblies, and sub-components). Once an HES is designed, supporting documentation for the manufacturing process must be completed, and the integrated purchase and inventory control must be supported. In order to obtain the best possible efficiency, any PLM-supportive, CAD-CAM tool for interoperative electrical and mechanical design must also integrate with existing company-wide engineering, manufacturing, and purchasing processes which are used for the subordinate assemblies that the connectors link together. There is a definite need for a tool supporting and enabling higher levels of integration, automation, and adaptation of solutions across disciplines and particular specific assemblies that make the job of designing and engineering electrical hardware systems, and managing the associated data, faster and more efficient. Furthermore, as more and more complex assemblages are being envisioned and designed, there is a need for a tool that turns 'design and systems integration' into real-world manufacturing results. The re-use of as many component parts, and the ability to convert vendor economies (such as volume discounts or special trade considerations favoring one particular vendor) requires a tool and approach that considers more than theoretical and engineering constraints.

For example, the design of a connector from one component (a power source) to a second (a motherboard) may involve the following steps: (1) specifying the electrical input constraints for the PCB assembly, i.e. the motherboard; (2) selecting the connector type (for the link from the power source); (3) determining the first end of the connector's gender (to the power source); (4) delving through manufacturers' catalogs and websites to find a manufacturing part number for that connector; (5) repeating step 4, but this time to find out the supplemental details such as the backshell, tolerances, pricing and availability; (6) selecting the connector's cable and shell material; (7) repeating steps 2–5 for the other end (the one linking to the motherboard; (8) checking for logical and electrical connectivity against both ends' constraints; (9) producing the assembly drawing for the design; (10) producing the Bill of Materials for the design; and, finally, (11) updating ECO and document control and versioning records—and then the design can be turned over to the manufacturing process.

This process, with appropriate variations, would be repeated for each HES and its internal assemblage of components, and for all sub-assemblies and sub-components, recursively until the bottom-level components are reached. A manufacturer wishing to be flexible will not want a tool that forces a designer to accept a uniform level for what constitutes an 'atom' for a particular HES design; what is needed is one where the granularity of what is 'atomistic' may range from an entire sub-assembly (e.g. a power source, incorporating a transformer, plug, in-board connections, and even cooling fan and heat-sink) through a complex but standard IC (or 'Integrated Circuit', each of which comprises a subassembly of multiple transistors, gates, resistors, and other subordinate electrical circuits), to a single but internally complex element (e.g. a coaxial cable, with its outer and inner shielding, cladding, conductive and core elements).

Going back to an earlier example, lets the gap in the prior art be shown. Connectors are used in every possible system of electromechanical equipment available on the market in every industry worldwide, yet have not had their design and manufacturing process automated; for the industry either has focused on the needs of the particular specific parts, or has considered connectors to be 'solved' technology and ignored the need for automation and integration with other CAD-CAM systems and processes. Industries that design, manufacture, or use connectors include the computer, electronic, telecommunication, optical, medical, biotech, industrial equipment, automotive, aircraft, oil, chemical, and plumbing industries; in fact, they may be extended to any industry where the need is for tools that can support designs and manufacturing processes that focus on the physical, logical, and economic flow path of information, control, and content for materials. Electrical and mechanical assemblies are even more widespread. Yet the tools, as described above, have generally limited themselves to one discipline, one approach, or the second. Generally, the focus of the engineering and design 'smarts' has been on providing tools that only support efforts involved in the design for feasibility, rather than on manufacturability; let alone on adaptation within and without the company during a product's lifecycle. Part of the problem has been the absence of universal, standardized, specification requirements across both electrical and mechanical domains. One manufacturer may simple list a part's plating as being 'gold'; a second as being 'gold, 15 mm' and a third not at all—while all three use the same classification and name for that part, creating an illusion of identicality, and complicating tremendously comparison amongst manufacturers. Furthermore, there has been no uniform requirement for specificity, which has allowed a tremendous concealed variation to develop.

Even today engineering and manufacturing firms continue to incur high costs and time associated with HES designs, including the subset of connector designs, when transitioning from 'napkin' to 'manufacturable' design for anything using 'on the shelf' or pre-existing components. This is partly because this element of engineering has long been viewed as in essence a readily solvable problem, an application of 'cookbook' engineering. So hardware and electrical system design (as opposed to particular component design) remains largely a manual and multidisciplinary process, where designers and engineers are given the specifications (determined by the HES functionality) and then asked to use the information from many vendors to come up with the 'cookbook' solutions. Highly skilled and costly engineers then engage in a manual and time-consuming process using their memories, paper, whiteboards, spreadsheets, the Internet, and piles of vendor catalogs to first produce and organize a design, then to manually produce assembly drawings and bills of materials, and finally (as production shifts into gear) to process numerous engineering change orders as physical constraints, subcomponent dimensions, logical interconnections, physical layering for manufacturability, and other real-world constraints shift and change. This may be cookbook engineering, but it is a cookbook where neither the FDA nor any 'consumer watch' organization has been able to establish a universal weights, measures, qualities, and—most importantly—descriptive terminology, to which the suppliers must adhere. There is a great difference between #12 durum wheat flour, and potato flour; there is even more difference between a DIN-15 hi-lo and DIN-15 lo-hi connector end (before considering whether they are screw-attached, clamp-fixed, shielded, unshielded, etc. etc. etc.).

There also are enormous inefficiencies associated with hardware and electrical systems design and the integration into the entire manufacturing process for any complex system. The current process has great potential for errors arising from unchecked and mistaken assumptions, from data entry mistakes, or from undocumented, prior design determinations that conflict with new manufacturing requirements. There are also significant constraints on the engineers' ability to find and integrate existing design or vendor information within any company which limit the re-use of already-extant solutions. And there is no automatic or ensured coordination with other enterprise information that, properly, should influence design choices, as such enterprise information should guide the product through its lifecycle management. (For example, dropping a formerly-related vendor may set off a chain of redesign to switch 'equivalent but not identical' subcomponents whose pricing or availability may be dramatically altered. Or a previously-unconsidered constraint (e.g. temperature range stability) may mean the substitution of one subcomponent for another, to allow minimization of separate vendors over multiple product lines.

One problem that has arisen in the rapidly-expanding and changing manufacturing world: non-end-product manufacturers, who sell components to other manufacturers, often want to 'lock in' their existing customers through information and design manipulation, rather than depend solely upon the harder-to-guarantee pure price advantage. These manufacturers recognize that every specific detail for any aspect of a particular component which need not match an externally-specified standard or constraint (whether such be color, temperature tolerance range, physical dimension limit, component material, pin assignment, voltage drop over time, etc. etc.), might not be readily discoverable, or might subject to change. These non-end-product manufacturers may wish to create or sustain an appearance of differentiation, hoping that the 'FUD factor' (Fear, Uncertainty, Doubt) will keep existing customers from shifting their purchases based on a minor cost savings—because their customers cannot be certain that the new supplier's purportedly similar component will prove to be functionally equivalent. They are also depending on the reality of engineering inertia: once a component has been examined and fully evaluated by a customer, and used, it will be preferred as it represents a 'known quality', over an as-yet unexamined and only partially-confirmable 'similar' product from a competitor. For no one engineer can keep abreast of, and test, all the existing components and establish the requisite knowledge base to permit, in the light of only partial manufacturers' documentation, when "true" and when "incomplete" equivalence actually exists. One important limitation to design and manufacturing assistance programs has been the reluctance of manufacturers to provide a universal, standard description for all of their components; instead, there is a continual drive for differentiation for marketing advantage. Complexity, in this area, is the friend to the provider, not to the consumer of his products—even when the 'consumer' is a higher-level manufacturer. Because once a product becomes generic, its only remaining competitive arenas are price and availability.

SUMMARY OF THE INVENTION

The present best embodiment of the invention is an interactive software tool that can be used on a stand-alone basis, or in an alternate embodiment in and through an Internet-based Engineering Design Center (iEDC). This software tool is a Product Lifecycle Management (PLM) System, which coordinates:

a) a Resource Management Subsystem;
  b) a PLM Management Database;
  c) a Collaboration Subsystem; and,
  d) a Project Management Subsystem.

The PLM System will take inputs from, and provide outputs to, CAD applications from different vendors (preferentially the most commercially available and popular), and will allow the user to create, structure, track, and manage multi-discipline projects, i.e. those which incorporate electrical, mechanical, optical, software, and other subordinate elements from different fields.

The PLM System will manage the design considerations which cross the boundaries between projects, or even between organizational groupings (at the same level), or even across organizational boundaries (i.e. across related or even unrelated companies). Such would include, for example, the maintenance of standards, coordination of design changes or accommodations; management of resources and timing; documentation unification, tracking, coordination, and control; Engineering Change Order processing; and related manufacturing efforts (including timing, distribution, purchasing, ordering, delivery scheduling, and timing). The PLM System is an explicit tool that not only recognizes that any HES is both a cooperative and competitive effort and provides means to maximize the former approach, which grants an advantage in lowering the frictional and information-limited costs of the latter approach to product design, production, and life-cycle.

The Project Management Subsystem, in turn, comprises the following:

a) a Project Database;
  b) a Component Database;
  c) a Manufacturing Subsystem;
    i) a Purchasing Subsystem;
  d) a Component Data Management Subsystem;
  e) an Auto Engineering Change Order Subsystem;
  f) a Bill of Materials Generator; and,
  g) a Design Subsystem, which in turn comprises:
    i) a Design Rules Check Engine;
    ii) an Assembly Drawing Generator;
    iii) a Verification Module;
    iv) a Simulation Module; and,
    v) a Testing Subsystem (for Hardware and Software).

The other subordinate elements of the Product Lifecycle Management Subsystem, and the subordinate elements of the Project Management Subsystem, are described in more detail below.

OBJECTIVES OF THE INVENTION

Figure 1:
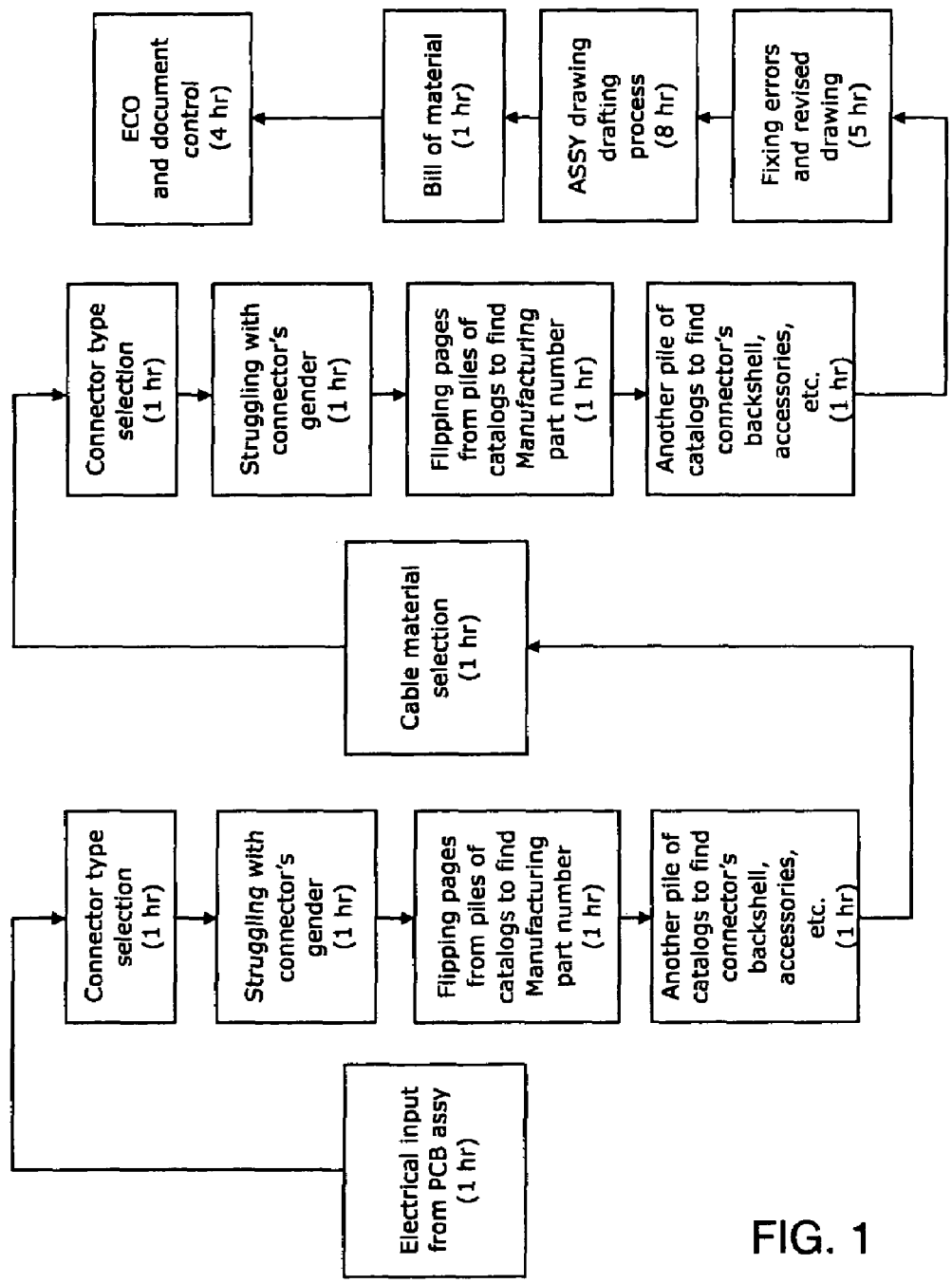
FIG. 1 is a generalized representation of the current state of the art for HES design for a consumer product incorporating both logical (or electrical) and physical (or hardware) aspects; e.g. a cable assembly for a consumer electronics product.

What are some of the needs of a PLM-supportive, CAD-CAM tool? These can be best considered by first, viewing existing problems with electrical and hardware systems design, and then reviewing additional elements and tasks a PLM-supportive CAD-CAM tool might preferentially incorporate.

Existing Problems with HES Design

First, even a 'simple' HES design requires mastery and control over an enormous variety and quantity of data, which, if inaccurate, results in avoidable inefficiencies and delays delivery of products to market. Physical, mechanical, electrical, and manufacturing requirements must be considered and both the physical and logical details specified to the extent necessary to the interconnection's function within the system. Identifying or finding, and then purchasing, the necessary components with the required specifications typically involves extensive search through numerous catalogs, phone calls to distributors and manufacturers, and browsing the world-wide web.

The economic or business aspects of the design process have generally been ignored by the previous generations of CAD-CAM tools. One key element that has been overlooked is contained within the question: "Why should we have to re-invent the wheel?" Any CAD-CAM tool should permit, if not presume, that part of the approach will be to search for previously-created components or parts already in existence, either from previous projects and designs within an organization, or from external vendors. Any PLM-supportive CAD-CAM tool will allow rapid search and cross-reference comparison, amongst the thousands of already-extant components. Doing this, however, requires either a universal standard adhered to by all manufacturers, or using a database which enables a user to determine whether the necessary functional equivalence for the proposed HES design is actual, claimed, or unknown, for each particular data aspect of each particular component.

Secondly, an accurate and detailed manufacturing design for each component, and for their connections, and for their interoperability, must be generated; as well as the necessary supportive documentation, with all requisite details fixed for all incorporated components, that meet both the engineering and the business process requirements for full production. Each HES component requires its individual bill of materials (BOM); yet optimally, to minimize inventory cost, control, and delivery flow concerns, subordinate components thereof may and should be common as much as is possible both with other components used in other sub-assemblies in the same HES, and even in other products and lines supported by the company. Any PLM-supportive, CAD-CAM tool will track not just the current design (and the state of each sub-assembly's design), but the version and ECO history for the entire project, and be capable of issuing a BOM for every specified design by version as well as component.

Thirdly, the PLM-supportive, CAD-CAM tool must allow for variable, and differentiable, levels of atomistic granularity, both from project to project and within each project. Every component need only be specified down to the 'sourcing' level, that is, the level at which that component is incorporated into the project. If a component is bought from outside, the details necessary are those which ensure that it meets the constraints (electrical, physical, and accounting) which define that component's "design space". If a component is to be assembled in-house, then the sub-components and assembly must be further refined, designed, and tracked. For example, one HES may only require that Part 37-C be a 'DIN-9, standard environment cable with dual female ends'; but a second may have to specify for Part 453*a* (another DIN-9 connector) its total length, connecting back-shell materials, attachment means, temperature constraints, EMP resistance, and the logical order of its 9 internal connections. In the first instance, the granularity stops with the 'DIN-9' connector being treated as a single, atomistic element; in the second instance, the subordinate parts of the cable become the atomistic elements.

Fourthly, means for identifying and substituting equally acceptable alternative components (due to real-world based problems such as delivery failures, cost changes, or identification of previously-unspecified incompatibilities) all must be provided, to enable the manufacturing process to flow efficiently. Thus, a PLM-supportive, CAD-CAM tool will allow rapid classification, identification, and comparison across manufacturers for components meeting the necessary constraints for that particular design, the identification within the project of the substitution, and the issuance of the resulting, necessary, and correct, proper project documentation.

Fifthly, accurate, suitable-for-manufacturing design drawings with all the required specifications incorporated and listed must be provided, in formats which can be electronically or humanly comprehensible by a variety of computer programs and users. And when design changes are made, the previously existing dependent manufacturing process documents and orders must also be changed. Thus a PLM-supportive, CAD-CAM tool will create both design and assembly drawings, capable of displaying the logical and physical aspects of the finished assemblies.

Finally, when shifting from abstract design to manufacturing and support, a PLM-supportive, CAD-CAM tool that supports the task of validating all of the design's interconnections and functionality is definitely desirable. At present validating HES functionality is likewise largely a manual process of creating, plugging in, tracking, and testing the both the individual component elements and all combinations of the connections amongst the multiple independently-designed assemblies or components. A final, complete HES often represents a design that crosses a number of particularized and specialized engineering sub-disciplines (chips, backboards, busses, power systems, cooling and other physical environment management devices, or function-specific peripherals such as printers, modems and other communication link devices, input/output devices, monitors, or activators and controls). Many frustrations, cost overruns, and slipped schedules are generated by manually-driven interconnections between multiple disciplines; because human weaknesses, one being that of focusing on one's particular specialty, the other being that of lacking capacity for mastering the complexity of details for the entirety, come to the forefront.

Additional Elements and Tasks for a
PLM-Supportive CAD-CAM Tool

There are two additional levels of elements, and tasks, which a PLM-Supportive CAD-CAM Tool incorporates. The first level supports the detail management for each particular project or design as it moves through initiation to production; the second level supports the management of a number of projects or designs, both concurrently and for the manufacturing and production cycle, providing the overall context in which each such project or design will exist.

At the first level, the PLM-supportive, CAD-CAM tool must help with: (a) knowledge about the atomistic components (remembering that granularity may vary within and amongst designs); (b) the design process (described above); and (c) project management. This latter category would include coordination amongst various corporate departments and/or personnel; tasks (design, validation, production) scheduling; resource (physical, fiscal, personnel, and knowledge) management; calibration; and inter-project communication.

Many firms spend thousands of man-hours annually trying to keep up with the task of configuring their collections of knowledge about electronic, physical equipment (computers, peripherals, and other network points) into a coherent, connected, and correct collection. As a result, the current process is expensive, time consuming, and keeps engineering resources from assignment to more creative and productive activities. This task is intentionally made more complex by manufacturers attempting to project a false differentiation. A separate, but by no means lesser task, is providing usable representations of the knowledge, which means support for categorization, unification and differentiation according to multiple criteria, and both textual and graphic representations. (These latter can each be further subdivided; for example, graphic representation may be best served by abstract, iconic, detail-hiding representation, or by a photo-realistic, tromp d'oile pictorial duplication, while textual representation may need a single class-identifying word (e.g. 'transformer') or a multi-line, collated, alphabetized, and differentially-headed table of specification details.) Everything from the sourcing manufacturer (and that sourcing manufacturer's part number) to the pricing, availability, and future delivery schedule may be incorporated for true PLM support, with the details being suppressible or accessible according to the current need of the user. A best embodiment would see different specification detailings from different sourcing manufacturers represented to the user in a single, unified, and validated comparable listing which does not overspecify, namely, one that does not for any given sourcing manufacturer promise details beyond those which the sourcing manufacturer warrants and provides. (For example, if a plating element were specified for a component, then that part of the component list might, for three different manufacturers, have and display three different entries "Gold", "Gold 15 mm", and "----". A designer might well want to know that the third sourcing manufacturer has promised nothing about the shielding, which will allow him to justify a more expensive alternative when that need is critical to the design.

Project management recognizes that design should no longer be an isolated and disconnected part of any HES product's lifecycle, but an ongoing and potentially shared involvement. This, however, means that tracking for each project, and for each user, the current state of involvement (e.g. "Fred's working on the transformer and, while he hasn't figured out the heat-sink placement for the bleed-off from the stepdown, has the input and output ports configured, so he can pass that information over to Jane, who's selecting the power cable, and to Ari, who's setting the backplane specs")—allowing the work to be shared. Feedback from the 'real world' or marketplace, whether it comes in the form of complaints ("your laptop computer fried my knees!") or customer-based Engineering Change Orders ("the Army needs an EMP-resistive shell capable of withstanding at least . . . ") should be integrated, as should version tracking and control ("Rev B/11 is suitable for AmTerTech's use in the Dog-Bo-Bark Toy, but Rev C/3 is necessary for the InterLaken Extensor motor control") information. A PLM-supportive, CAD-CAM tool might provide graphical representation of the current state of the project (meaning just that, an 'on-the-fly' but stable, if saved and no further work done, record of the state of the design and production and feedback for the project). Optimally, such would allow separate versions, and separate users, to coordinate without overwriting existing work or violating settled constraints, by locking out user actions which would violate such.

The second level of desirable functionality for a PLM-supportive CAD-CAM tool for HES design enables persons other than the design engineers to match constraints arising from corporate, rather than engineering, concerns. For example, a purchasing agent may want to shift use of a subordinate component to a new vendor to gain an overall pricing advantage, or a sales manager may want reciprocality of sub-component exchanges to override engineering and cost equivalences. This can create a great deal of design history, revision, and process management problem—particularly if the original reason, or the person responsible for its assertion, disappears without leaving a record. An advantage would accrue from automating the project tracking to flow both back through the version and ECO history, and forward to automatically revise both engineering and assembly drawings, and bills of material for the affected project(s). These advantages are potentially lost unless they are also reflected upwards to the highest level of the project management to revise the newly 'current' revision history and ECO change records.

Furthermore, because design increasingly is a shared and cooperative effort, both within and amongst manufacturers, a PLM-supportive CAD-CAM tool for HES design should allow and support both importing and exporting design and supporting documents in multiple formats, preferably including the most prevalent formats. ('Prevalent' rather than 'popular', to avoid the connotation of personal liking; complaints about Windows are almost as ubiquitous as that operating system, and so, too, are complaints about Word's '.doc' file exclusivities and quirks.)

Another desirable function supports reuse of subordinate designs (for sub-assemblies, sub-components, or sub-sub-versions of the same); particularly making such reuse available even for designs which were completed prior to the adoption of the PLM-supportive, CAD-CAM tool. The functionality of translating from a bill of material, or for a particular component which is not currently available, but for which a satisfactory equivalent can be found in the knowledge base, to a now-current design, greatly increases this capability; it can even allow the construction of a functionally-identical replacement for a no-longer-produced product, thereby reviving and sustaining what otherwise might be an orphaned product.

Every system that is comprised of a connected set of parts has two distinct and independent requisites that must be considered, tested, and correct for the system to function and for the flow path of information or physical substance conveyed by the system to work. The first requisite is that there be a physical interconnection. If one part simply cannot be attached to the second, the gap is undeniable. Something as simple as designing a plug with a female connector and the point it is to plug into with another female connector (one example of the 'gender mismatch' problem), can prevent attachment and interconnection amongst a complex system. (Even if the gap is crossed by a beam of light, if the sender and recipient do not have the transmitting and receiving parts, or the alignment, signal qualities, or the pathways are flawed, the gap is not crossed.) This requisite, being a physical one, sometimes is discernible by the human user, though perhaps requiring the aid of diagnostic tools.

The second requisite is that the correct logical interconnection is made at every point. An in-port requires input, not output; valves control directionality (and generally have further flowpoints connected to them); and electrical signals, even if the physical characteristics all match, must logically continue the same signal over a connector, for the cable or system interconnection to function as it is designed and meant to. A power pin should never be mistakenly laid as the signal-in line; knowing whether the bitlines read left-to-right or right-to-left can be crucial! Much of the complexity of cable design comes from having to take a mix of signals from one pattern of connections to another, with the proper transformations and/or translocations being made through and by the connector's design.

These elements of design have not been seen as esoteric or intellectually challenging, but as matters of precise, even exhaustive, but mundane detail. Yet the need to bridge the gaps between parts has usually not been a concern of those engaged in designing each particular part. Having specified and encapsulated their part such that it can be treated as a 'black box' or atomistic element, their interest evaporates. Jumping the gap to either the next element, or to the next HES, is not their problem.

In theory, HES design follows a logical path of specifying the needs, determining the subordinate parts (and subassembly processes) necessary for the components set by the design, identifying sources for said parts, obtaining said parts at the optimal prices (limited by other business concerns such as time availability, partnerships, and existing or proposed mutual linkages amongst parts), assembling said components, and testing the entirety for correctness and completeness.

But in fact how do companies design components—say, for example, connectors? "Well, we use three spreadsheets, two data table, hundreds of drawings and sketches, notes on the back of this envelope and Hank's amazing memory of how it all plugs together. If he gets hit by a bus, we're sunk." No CAD package available on the market offers the necessary tool. Providers of CAD applications, such as Mentor Graphics and Parametric Technology Corporations, concentrate on delivering the latest high-speed 3-D CAD software for specific hardware element designs. An engineer could use these applications to design the overall physical shape and internal subordinate assemblages comprising an x-ray machine, a computer system, an Internet server, an aircraft, or an automobile, indicating the particular sub-assemblies, overall structure, and general connections, but lacks a tool to design, check, and integrate into the manufacturing process each of the potentially hundred of connectors that bridge electromechanical assemblies and electronics subparts and interconnect these complex manufactured systems. Similarly, electrical logic design tools do not take into consideration the physical aspects of their components. There needs to be a tool which bridges the gap, which supports the design need to consider the electrical and physical interoperation which happens in the real world. The model must bridge currently separated domains.

No matter how conscientious and professional any engineering team is, errors are nearly impossible to avoid because of the numerous manual inputs needed in the current design process for any HES. Each manual step costs money and time in often extremely time-sensitive development, procurement, and manufacturing cycles. The manual design process for instance is inevitably plagued with human mistakes, which translate into project inefficiencies, and, subsequently, yields to delays to market. For example, one single HES for a semiconductor equipment manufacturer may comprise 450 cables. Because of the equipment complexity, any particular cable design may require between 3 to 10 revisions from the first prototype to finished version. These revisions usually will have to be made for more than 60% of the system elements (cables, in this example). And each revision requires tracking and altering all manufacturing-related documentation, to boot. The value of a PLM-supportive, CAD-CAM tool for HES is, well, patently obvious. Yet none have been created.

A further objective would be providing adequate representation to support the design process. This may differ depending both upon the nature of the current task, and on the varying strengths of the users. Sometimes, the best representation is abstractly symbolic; a connector end need not show every element of its detail when it is only one of sixty-four major and minor parts in a complex HES, unless and until the user wants that level of detail. Sometimes, the best representation is graphical, with a near-real appearance, which enables a designer to use the strong human visual-patterning capability to assess relative compatibility. Sometimes, the representation needs to be textual, or in a list format, so a rapid comparison across multiple categories can be made. Different designers will use a design tool differently; a good PLM-supportive, CAD-CAM tool will not presume that only one way is 'right' for all purposes at all times, and thus will be able to work with multiple ways, as well as over multiple levels.

In addition to the design aspect of the task, each HES requires both manufacturing and production process documentation; the former including assembly-ready engineering quality drawings ('ASSY'), and a bill of materials ('BOM'), and the latter tracking of the project state, product state, version state, manufacturing release and production dates, and state of satisfaction for each applicable and particular Engineering Change Order (ECO). Even designs which are not completed, or which never get into production, are useful when alternatives are later being reconsidered; these records can be vital when post-market activity raises questions of knowledge, intent, or other corporate responsibility. Yet often getting such documents out of the design engineers is harder than removing their PDA's (or teeth) would be.

The documentation and assembly-ready engineering quality drawings are used for the product manuals and assembly-line guidance, while the bill of materials are used to buy the required parts and control internal inventory. Coordination, for each component and subcomponent, of the mechanical aspects of structuring overall assembly, and the incorporated sub-assemblies, and of the electrical aspects, that allows the designer to shift between them without undue effort, greatly increases the flexibility and value of a PLM-supportive, CAD-CAM tool, and decreases the organizational cost in training time, or tracking time, alone; for both the physical design (CAD) and electrical logical design could be shared amongst the engineers with a common and already-translated representation common to both.

Primary reasons to automate design and manufacturing tasks to date have been to save expensive human labor and to prevent human mistakes by using the computers remorseless capacity for painstaking attention to every detail. The real advantage to a software PLM-supportive, CAD-CAM tool, however, lies in the full integration of every aspect of the process of going from idea to physical incarnation in such a complete and correct fashion that that process itself can be electronically and automatically reviewed and acted upon (and with). Computer-aided design that does not take into account the human and organizational need for parts control and testing, is not enough. Computer-aided manufacturing tools that do not allow for the human oversight, alteration, or preliminary (or failure-checking or alternative) testing, is not enough. A PLM-supportive, CAD-CAM tool that encapsulates and supports the entire computer-aided design and computer-aided manufacturing process for hardware and electrical systems that links currently separated disciplines and subordinate steps, is definitely an advance over the current state of the art. If, as the axiom goes, 'the devil is in the details', then a PLM-supportive, interoperative, CAD-CAM tool for hardware and electrical systems, including specifically as a subset thereof (but not being limited to) connectors, cables, wire harnesses, and system interconnections, can be analogized to an electronic exorcist for complex assemblages and systems. A further embodiment might allow specialization for different categories of manufacture by accessing differing libraries of knowledge about the components relevant to that category (e.g. an aerospace module, a skyscraper module, a plumbing module, or a civil engineering module, could be swapped in, or perhaps added to, a computer-electronics module). A second further embodiment might add the capability for simulation testing (physical and logical) of each completed assembly and project for pre-production testing and verification, allowing even more rapid, and dependable, prototyping to be pursued.

DETAILED DESCRIPTION OF THE INVENTION

The invention disclosed in this specification and its supporting papers is a software, PLM-supportive, Computer-Aided-Design and Computer-Aided-Manufacturing tool, which in the best embodiment herein is for multi-disciplinary Hardware Electrical Systems (HES). Among the objectives of the invention are: (1) automating the design process for HES; (2) reducing the costs for designing, and for manufacturing, HES; (3) significantly streamlining and integrating the design and manufacture of HES with that of the connected separate assemblies into an integrated system which includes for each HES design systemic testing, simulation, and validation; and (4) making more efficient the entire lifecycle from conception to manufacture to redesign and adaptation to reuse in more complex assemblages for complex, multi-disciplinary products. There are multiple parts to the PLM-supportive, CAD-CAM tool, which are described herein.

Summary Description of the Subordinate Elements

As stated above, the Product Lifecycle Management (PLM) System comprises and coordinates: (a) a Resource Management Subsystem; (b) a PLM Management Database; (c) a Collaboration Subsystem; and, (d) a Project Management Subsystem.

The Resource Management Subsystem links with and translates data between third-party planning software and records, enabling status reports concerning each project and design to be exchanged, and status report requests and feedback to be shared amongst workgroup members (linking the design engineers and managers to the broader workgroup or organization). The human manager for the project can use this tool to tune the particular attributes and details, and the timing, of such requests, reports, and interactions, while the users of the tool can transfer the relevant data or respond to external requests.

The PLM Management Database contains the records which are used by the CAD-CAM PLM program to control and coordinate all activities between the subsystems including the Project Management subsystem (and all of its subordinate elements), the Resource Management Subsystem, and the Collaboration Subsystem, to record, track, update, and report on the full lifecycle for all projects and products throughout their design and manufacture.

The Collaboration Subsystem collects records and shares status data amongst and across the differing organizational groups (design teams, departments, persons, or companies) involved in the design process being managed by the PLM Management System. Communication is by automatic messaging which is activated by the relevant events (e.g. design completion, of the entirety or for a subordinate assembly or component) and sent to the recipients designated by the users. The same structure is used for exchanging data and reports both internally and externally. While in a typical corporation the Purchasing Department will track parts procurements, Engineering will track design flow, and Manufacturing will work both on assembly of the product(s) and preparing assembly-related fixtures, each collaborates on managing a product's design throughout its lifecycle.

The Project Management Subsystem (10), in turn, comprises: (a) a Project Database (14); (b) a Component Database (12), which operates in coordination with a Search and Cross-Reference Engine (16), (c) a Component Data Management Subsystem (13); (d) an Auto Engineering Change Order Subsystem (41); (e) a Bill of Materials Generator (19); (f) a Design Subsystem (43), which in turn comprises: (i) a Design Rules Check Engine (18); (ii) an Assembly Drawing Generator (17); (iii) a Verification Module (63); (iv) a Simulation Module (65); and (v) a Testing Subsystem (for Hardware and Software) (67); and, (g) a Manufacturing Subsystem (45), which calls upon (i) a Purchasing Subsystem (69).

Each of the Component and Product Databases (respectively 12, 14), in the best method, is a relational database which can track and make use of the relationships between as and amongst their respective subject matters.

The Component Database (12) incorporates at least one library of components currently available through the open market, which are identified by manufacturer; and which includes for each such component the detailed specifications provided by said Manufacturer (plus whatever particular information has been discovered or is guaranteed to be valid). It calls upon a Search and Cross-Reference Engine (16) for rapid, attribute-driven filtering and finding of all potentially qualifying components to report to the Design Subsystem (43).

The Project Database (14) tracks for each project the design state, supporting materials state, current interaction, tool user, and the report, validation, verification, and documentation progress (or lack thereof) from inception through completion of that project.

The Project Management Subsystem (10) allows the user, when accessing the Component Database (12) through the Search and Cross-Reference Engine (16), to use a constraint-based approach for rapid classification and identification of identical, similar, and like components. This Search and Cross-Reference Engine (16) is also capable of reporting back for display to the user the particulars for each component, also using a unified comparable listing that permits actual rather than definitional equality to be used.

The Manufacturing Subsystem (45) provides assistance with the real-world responses to any product; its design often must be changed part-way through its lifecycle in response to external events. Sometimes, a change must be made to meet a specific, and important, customer request. Other times, a particular component may have to change as it becomes unavailable, too costly, or perhaps potentially available as a substitution. Each such change may require generation, recording, and tracking of a Deviation Authorization; each such also would in the best embodiment be fed by the Project Management Subsystem (10) through the Design Subsystem (43) to assure and ensure full equivalence of the change with the remainder of the extant design. A user would enter the particular component which is to be changed (by Manufacturer and Manufacturer Part Number, by Manufacturer and User Part Number, or by selection from the selection (87), list (93), or schematic (95)); the Design Subsystem would invoke the Component Database (12) and Search and Cross-Reference Engine (16) to find potential replacements, verify, simulate, and test the substitution, and ready the new documentation, after which the Manufacturing Subsystem (45) would display all parent assemblies (i.e. all higher-level components of which the part being replaced is a sub-component), from which the user would choose those to be changed. Three other functions—updating the BOM with the replacement part, changing the manufacturer part number, and removing the previous manufacturer part from the extant BOM ('red-lining') in the event of a non-replacement, for those parent assemblies chosen to be affected, would also be managed through the Manufacturing Subsystem (45).

The Component Data Management Subsystem (13) collects, collates, and manages the details for each and every component comprising a sub-assembly, sub-component, or part of the design. It also provides the current representation of the design, said representation being graphical, textual, list, or iconic, dependency-tree, or multiple of the above, depending on the user's expressed desire for less or more detail at that moment.

The Auto Engineering Change Order Subsystem (41) manages the documentation and tracks, for accountability, the decision-making and decision-effecting design changes as they are made for a given product. It also handles the transfer of the documentation package for a given design between design and manufacturing (from design to manufacturing for the initial production; from manufacturing to design and then back again, for an alteration which goes into production; or from manufacturing to design for a product which is removed from production but still remains part of the corporate 'knowledge capital'). Each change to a design starts with an Engineering Change Request, which is assigned a unique identifier. As the request moves from a design objective or specification to a completed design, this process is tracked and managed by a Engineering Change Order (which is also, in the best embodiment, given a distinctive but related unique identifier). This permits version control over a product which links specific features, elements, functionality, and specifications and constraints that it is designed to and certified to meet, to a particular unique identifier, time period, and personnel responsible for the change, ensuring accountability for the decisions and process. For temporary, or interim changes, when a full ECO process is too onerous, the Auto Engineering Change Order Subsystem manages the alterations and decision responsibility tracking through Deviation Authorization (DA) tracking. By checking a user attempting to create either an ECO or a DA against the corporate accountability records, which indicate who is authorized to initiate any alteration for each particular project or product (part of what the PLM Management Database (48) controls), the Auto ECO Subsystem (41) ensures that corporate management is not accidentally mishandled through over earnest or improper substitutions or changes.

The Bill of Material Generator (19) recursively produces, for each project, design, assembly, sub-assembly, and component, a Bill of Materials indicating every particular part, its source, the number of such identical parts used at that level, the source manufacturer's product number, the user's product number, and selected specification details.

The Design Subsystem (43) manages the activities and processes involved as a design is generated. Its subsystems are described below. It will take input from the user, from a file from another CAD program, or even from a Bill of Materials, which can then be used to generate a design. Alternatively, if the input comes from converted electrical information or from any commercial schematic capture CAD or PCB layout program, again a Bill of Materials and design can be automatically generated. The preferred embodiment contains a module that directly translates inputs from all major schematic capture CAD or PCB layout programs into an optimized standard format used by the tool, preventing any need for error-prone manual re-input.

The Assembly Drawing Generator (17) takes the current design and for each specified component produces a drawing showing that component and its current state of connection to other components within its context; for an uncompleted design, this could include, for example each end of a connector but not the as-yet unspecified cable linking the two.

The Verification Module (63) addresses a major problem in HES designs. As design complexity increases, so does the risk of a design failure—one major class of such being the incorporation of what is known as a 'sneak path', which is an unintended current path, into an electrical circuit. Sneak paths, also known as sneak circuits, can be highly unpredictable and can lead to incorrect operation of or damage to electronic components in the HES being designed. Identifying potential sneak paths during the design process enables the design team to take corrective action before any manufacture starts, and certainly can save time and money in all phases of the product lifecycle. Several types of sneak paths can be identified including reverse current, power-to-power and ground-to-ground. This module produces, for a completed design, a report of potential sneak paths (and classify them), which includes a list of the components and topology relating to the sneak path on which the designer can focus both testing and reconsideration and redesign efforts. Furthermore, should any component be determined to be a failure point (either by designation by the user, from the results of the Simulation module's logical functional testing, or the real-world prototype testing), this module helps analyze any resulting consequences for the entire system, and will notify the user about which component(s) or sub-system(s) will not work properly, and include the damage estimation, for redesign and costing evaluation.

The Simulation Module (65) performs logical functional testing for a given level of the HES design, reducing the need for more expensive, and more time-intensive, physical embodiment (prototype) testing. For example, all signals are tracked across the interconnections of all the components and subassemblies of a particular HES's design, to ensure that there are no unnecessary and confusing duplications of signal names, interfering mis-connection of lines (data vs. power, for example), missing connections (lack of a 'ground'), no signal incompatibilities or other failures to match the logical specifications of the design (e.g. signal incompatibility at different ends of the same connector, or a part requiring DC signals being connected to a high-speed line) being managed by the Design Subsystem (43), or the promised attributes and specifications of the proposed components as reported from the Component Database (12) or Project Database (14). By treating any particular assembly as effectively 'an enlarged microchip' for logical analysis, potential future problems with logical and signal incompatibility can be detected and corrected at an early, pre-prototype stage of the design process, thereby dramatically improving productivity and reducing the cost of the design process.

The Testing Subsystem (for Hardware and Software), which is an extension to the preferred embodiment that requires additional hardware suitable for the particular tests to be run to be connected to the computer running the PLM-Supportive, CAD-CAM tool, adds the ability to test a fabricated, actual HES against the specifications, constraints, and design requirements specified in the Project Database (14); and for each of that HES's subordinate assemblies and components which are tracked, either in the Project Database (14) or Component Database (12). This connection between the analyzing and monitoring element of the tool and the actual test equipment can be through any communication port (COM, LPT, USB, 1394, Ethernet, Firewire, IR, etc.) permitting data exchange. The Testing Subsystem will generate a report of the specified test process and its results for each run, including specifically for each tested attribute the results (e.g. whether the test was successful, failed, incomplete, or not applicable). The test can be compared against a specific design file created for an HES for analysis.

The Purchasing Subsystem (69) enables a dual-access flexibility to enter into what are now often totally separated corporate functions. In one access path, it permits non-design engineer employees (such as purchasing agents) to access and use, through the Manufacturing Subsystem (45) and Project Management Subsystem (10), the Component Database (12) and Search and Cross-Reference Engine (16) to select, allocate, and buy all of a product's required components and parts. In a second access path, it permits design engineers to submit purchase requests directly to the purchasing agent, either for prototype construction or for completed designs at design sign-off which are being transferred to the Manufacturing Subsystem (45). A second function provided by this subsystem is the automatic notification to the receiving party (manufacturing engineers or design engineers or manufacturing schedulers) when parts arrive, notification which is keyed not by source part number alone, but by the parent assembly/products with which such parts are associated. If new or different documentation is associated with the ordered and/or received parts, the Purchasing Subsystem (69) notifies those responsible for document control and maintenance of the Component Database (12), PLM Management Database (48), and associated change tracking. This subsystem also ties into any existing inventory management and financial cash-flow and payment tracking programs, and is accessible to project and corporate managers who need to track the current state of any purchasing option's affect on the manufacturing constraints and status. In a further extension to the preferred embodiment, direct e-Commerce purchasing orders could be automatically generated, tracked, and reported through the Purchasing Subsystem (69).

DETAILED DESCRIPTION OF THE DRAWINGS

FIG. 1 is a generalized representation of the current state of the art for HES design for a consumer product incorporating both logical (or electrical) and physical (or hardware) aspects; e.g. a cable assembly for a consumer electronics product, showing the steps currently taken from receiving the specifications for the electrical inputs from a Printed Circuit Board assembly program, to turning the design and project over to an Engineering Change Order and document control process.

Figure 2:
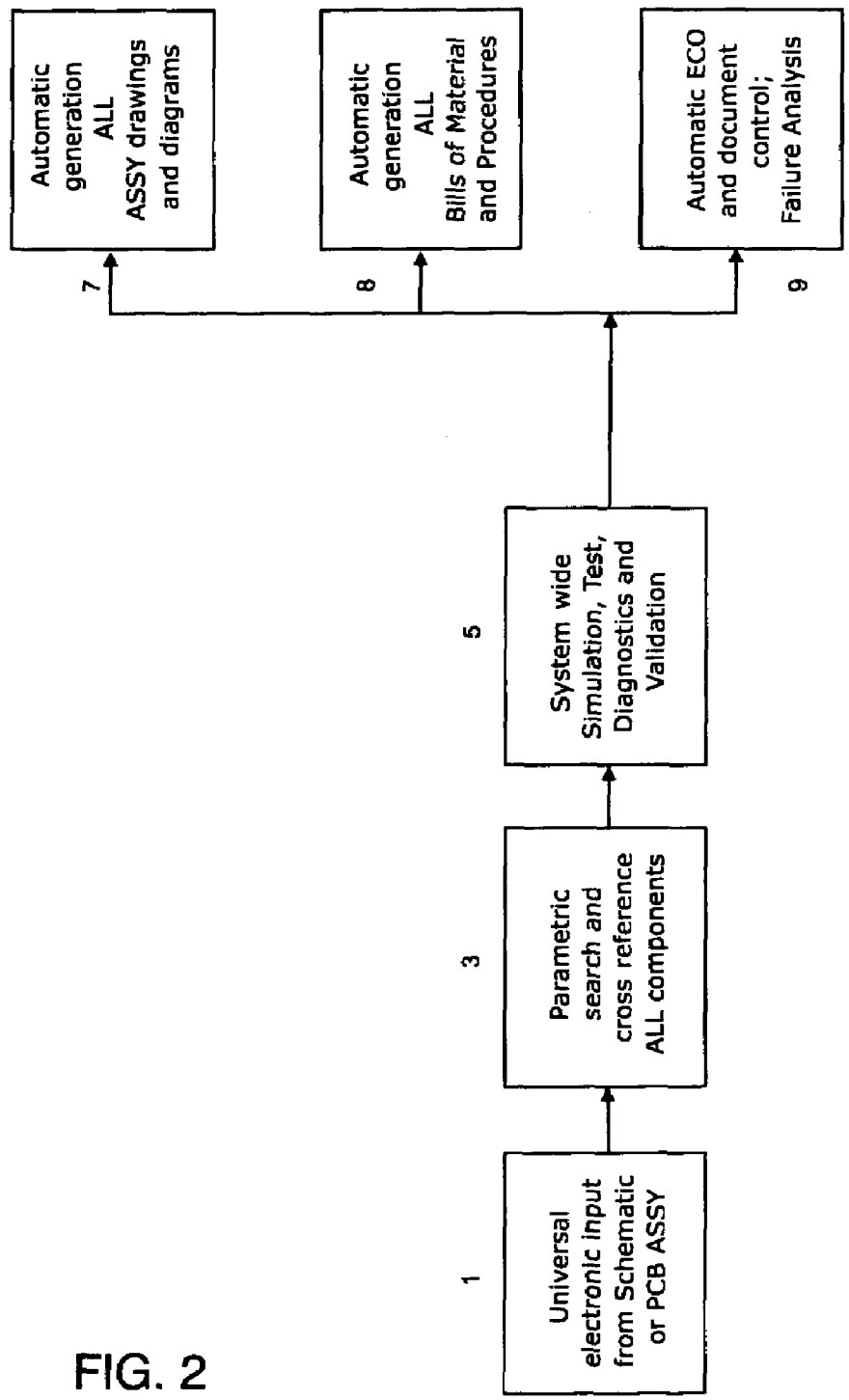
FIG. 2 is an abstract representation of the method embodied in the best embodiment of the invention.

FIG. 2 is an abstract representation of the method embodied in the best embodiment of the invention, showing the major steps in the method with a simultaneous automatic generation of the documentation and materials needed to manage the manufacturing process. The first step is to produce a specification for the electronic inputs, pursuant to the design constraints and requirements from a schematic, a Printed Circuit Board assembly program, a human engineer's input, or any combination thereof (1). The second step is to make a parametric-based search for, and cross-reference check on, all components at the level of design granularity selected by the user and supported by the components and project database (3). The third step is to provide system-wide (i.e. for all components and their designed combination) simulation, test, diagnostic and validation for the completed design (5). The last steps are automatically generated, either simultaneously or in any selected order, as the method produces all requisite assembly drawings and diagrams (7), all Bills of Material and assembly procedure listings (8), and all Engineering Change Order and documentation control, and all Failure Analysis, documentation (9).

Figure 3:
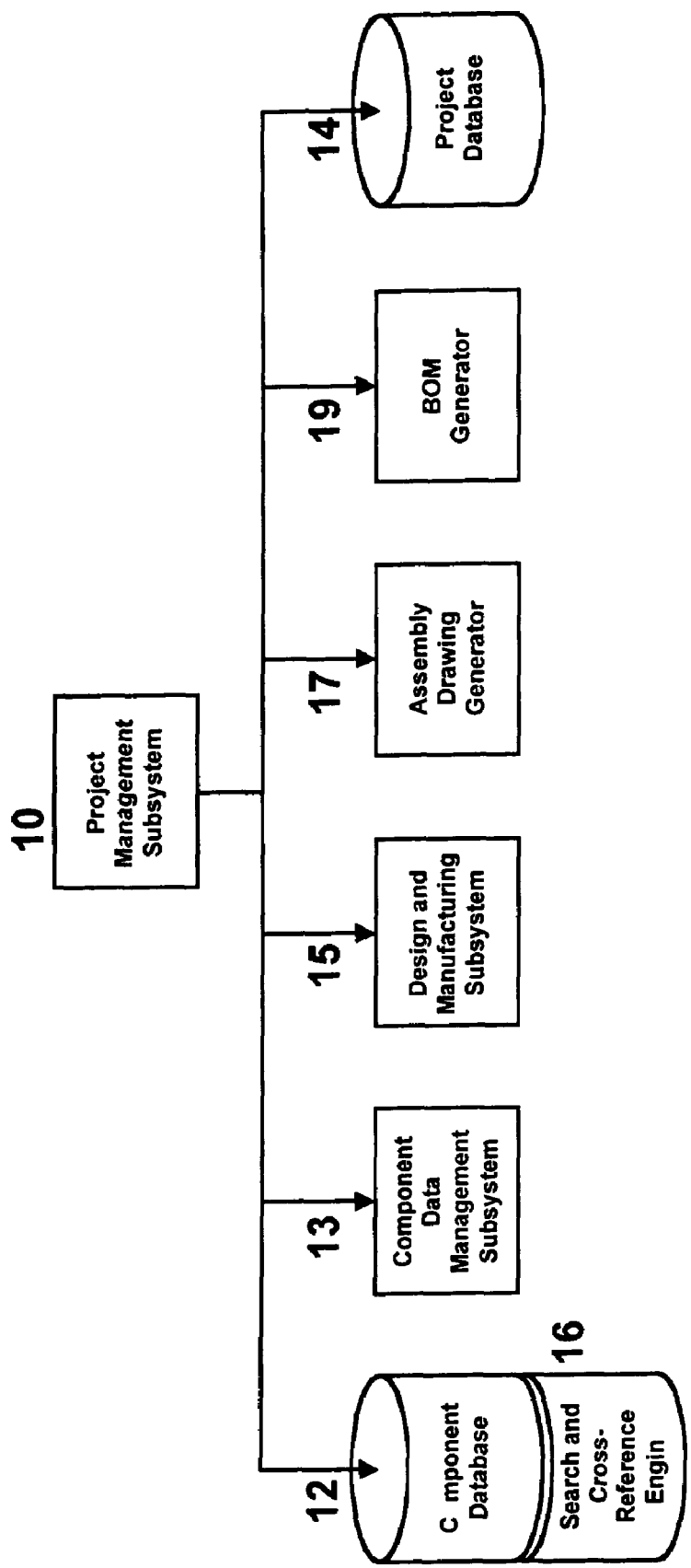
FIG. 3 shows the hierarchy and interrelation of the components comprising the core embodiment of the invention.

FIG. 3 shows the hierarchy and interrelation of the components comprising the core, least costly for the customer, embodiment of the invention. Each particular HES is a project, and is managed by a Project Management Subsystem (10). This controls the compilation of existing potential sub-components or assemblages, which are found either in the Component Database (12) or the Project Database (14) where past designs are located. The Project Management Subsystem also controls the Component Management (13), Design and Manufacturing (15) subsystems and the Assembly Drawing (17) and Bill of Materials or BOM (19) generators. The subsystems govern the user's interactions with the design constraints and existing and known components and/or designs; the generators take the current state of the design and produce the drawings and listings required for the manufacturing process.

Figure 4:
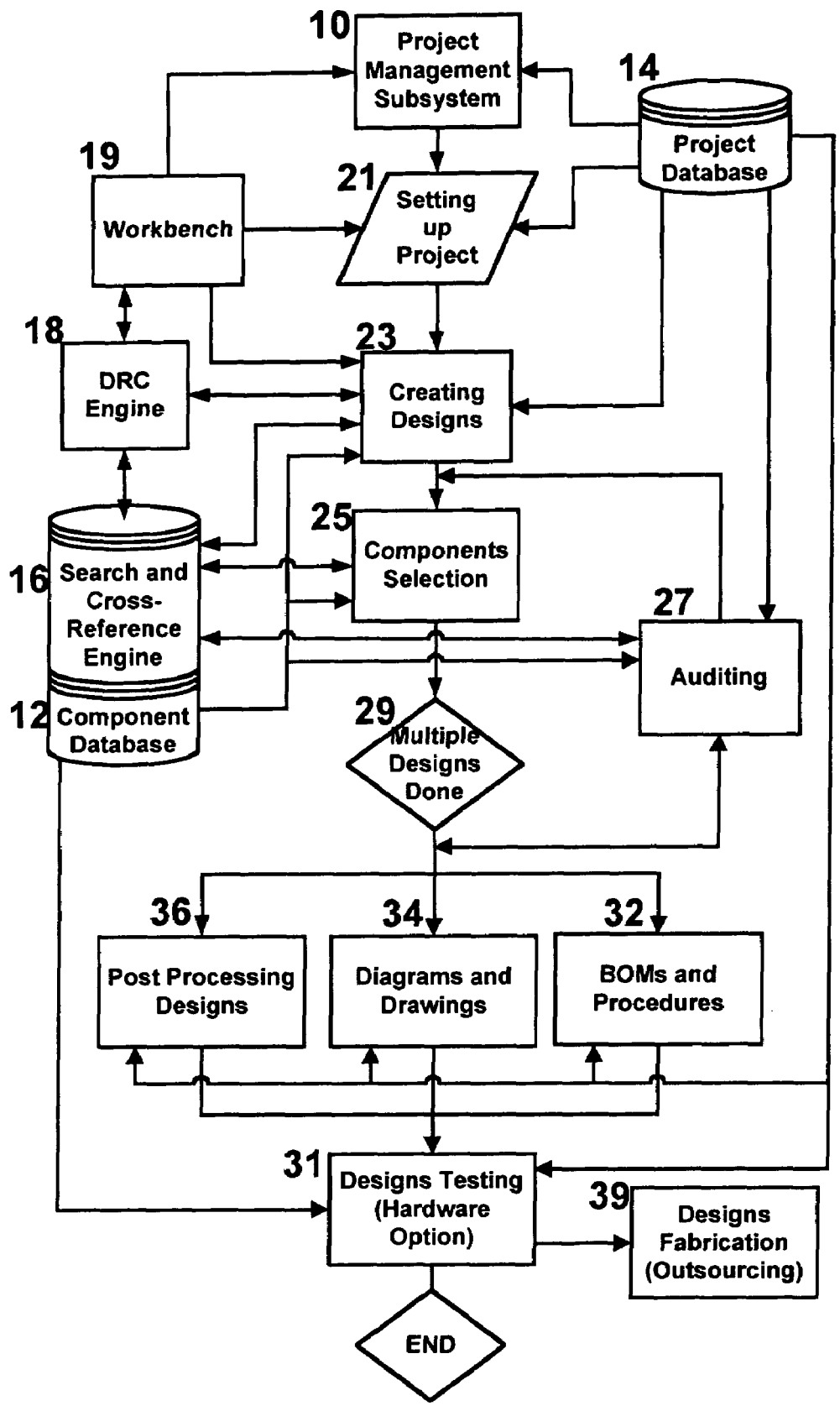
FIG. 4 shows the flow of operations of the method embodied in the invention, which takes place interactively with the user, from inception of a project to its end, and the interaction with core components.

FIG. 4 shows the flow of operations of the method embodied in the invention, which takes place interactively with the user, from inception of a project to its end, and the interaction with core components. The Project Management Subsystem (10) will either use an existing Workbench (19) or establish a new project (21); it will call upon a Project Database (14) containing the details of existing designs. Once the computer-based 'workspace' for the current design is established, the personnel responsible for the new HES product begin to use it to create the design (23). They may use inputs from a number of sources. The first of these inputs will come, in coordination with the Search and Cross-Reference Engine (16), from known components (12); the other sources may include from previous projects (14), from the initial Workbench constraints (19), and from a Design Rules Check (DRC) Engine (18). The inputs into the Workbench (19) or initial Setting Up (21) may come from an external specification-providing program (e.g. a PCB Ass'y program) or manual inputs (not shown).

As the HES which is the subject of the project may incorporate subordinate components, which also need to be designed or incorporated, this tool may recursively call upon itself and invoke a lower, and more finely detailed, level of granularity. For example, a project for a new laptop computer may simply specify a 'cooling fan' at the top level of the design and project; but the particular details of that component (size, power requirements, housing, orientation, number of blades, material, ERF emissions, power cabling, etc.) may become a sub-project; and then the particular details of each of its components may again recurse and become a sub-sub project (e.g. the power cable's length, resistivity, heat tolerance, end connectors, etc. may need to be detailed).

For this reason, there are a number of feedback loops shown. One such is between Components Selection (25), Multiple Designs Done (29), and Auditing (27); a second loop is between Components Selection (25), Search and Cross-Reference Engine (16) and Components Database (12), and Creating Designs (23); a third loops from the Project Management Subsystem (10) straight down through elements 21, 23, 25, 29, 36/34/32, to 31, then back up through 14 to the Project Management Subsystem (10) again.

When a design has been completed and audited, it passes on to the final stage, where the automatic generation shown as the last simultaneous steps in FIG. 2 take place, as tool generates BOM's and assembly procedure listings (32), generates the design drawings and manufacturing diagrams (34), and generates the Post-Processing documentation and operational controls (36). These would include documentation tying to every Engineering Change Order (not shown), or compliance testing pursuant to or required by external authority (e.g. Underwriters' Laboratory, federal or state regulatory agency, or international standards and testing organization) before full production and sales could begin. The final step of Design Testing (31), which could be to match the design against the original specifications, or against new, and alternate possible markets is performed, after which the design is presumed completed and production can be automated or the results outsourced to an external fabrication source (39).

Figure 5:
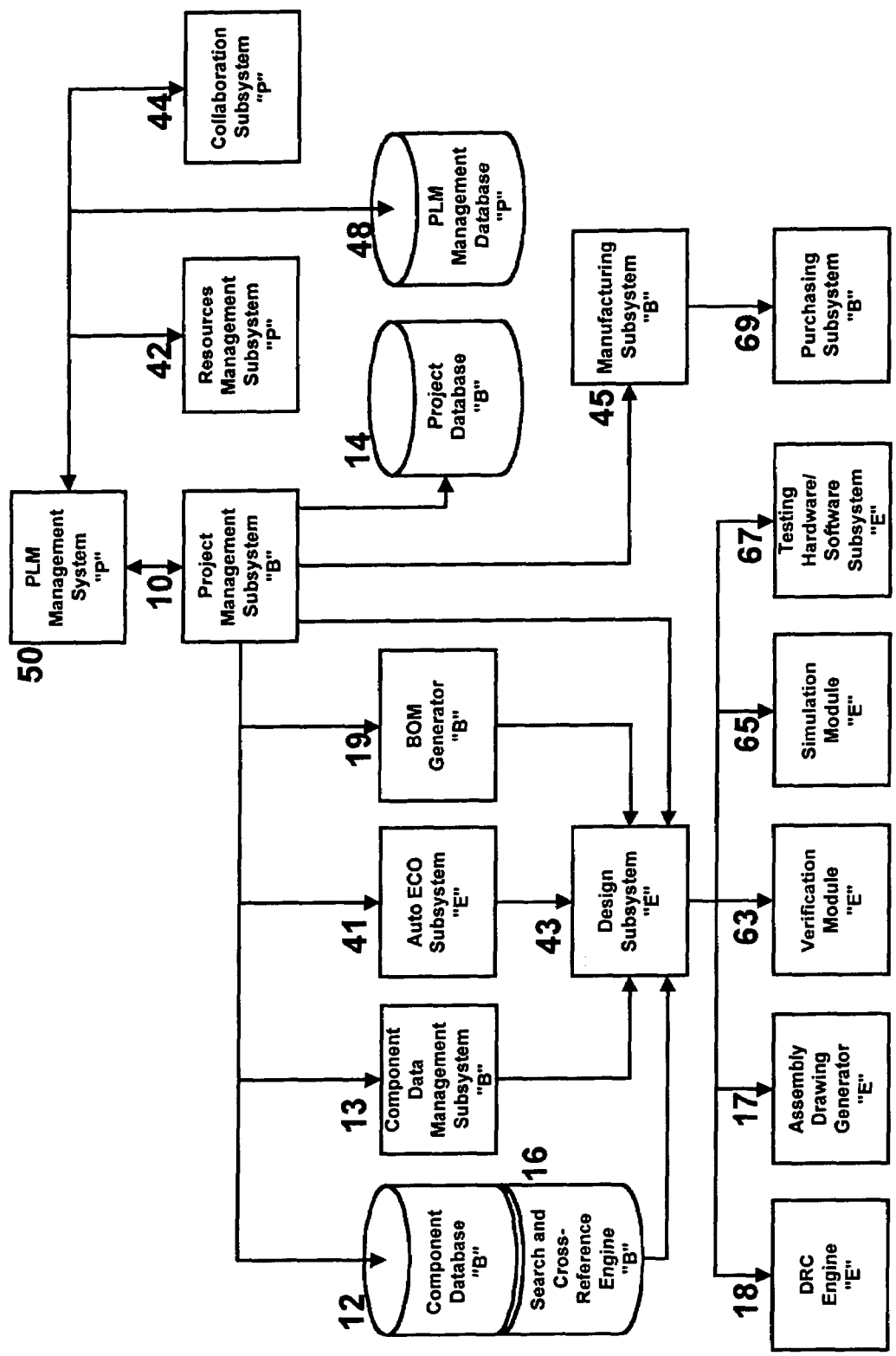
FIG. 5 shows the hierarchy and interrelation of the components comprising an alternate and more extensive embodiment of the invention.

FIG. 5 shows the hierarchy and interrelation of the components comprising an alternate and more extensive, more expansive and more expensive, but preferred, embodiment of the invention, than that shown in FIG. 3. The software modules and industry-specific databases enable alternative configurations to be prepared for customers depending on the latters' preferences and pocketbooks. In this preferred embodiment the top-level is the Product Lifecycle Management ('PLM') System (50), which incorporates broader, potentially corporation, industry, or even global specifications and considerations. These include a Resource Management Subsystem (42) for coordinating and managing resources amongst different and distinct projects and designs (e.g. to ensure all HES designs use the minimum number of different sizes and lengths of screws in their assemblies), a PLM Management Database (48) to make available knowledge and references relevant to the PLM concerns, and a Collaboration Subsystem (44), to encourage sharing of expertise, components, designs, and processes (for example, scheduling assembly operations to minimize down-time may have a 'fab' alternate between volatile-component, stable-component, and inert-component designs, an option which goes beyond the constraints of any one such component's project concerns). The PLM Management System (50) also calls upon the Project Management Subsystem (10); but the latter is a bit more differentiated than that shown in FIG. 3. Because the PLM approach manages concerns over manufacturing which go beyond those considered within each individual project, the Design and Manufacturing Subsystem (15) is now divided into a Design Subsystem (43) and a Manufacturing Subsystem (45). The Design Subsystem, in turn, incorporates new modules for Verification (63), Simulation (65), Testing (67), and a Design Rules Check Engine (18). The Design Subsystem also works with the Component Database (12) and associated Search and Cross-Reference Engine (18); with the Component Data Management Subsystem (13), with the Automatic Engineering Change Order (ECO) Subsystem (41), and the BOM Generator (19); namely, with the other elements called upon by the Project Management Subsystem (10). For products which are being manufactured, the Project Management Subsystem (10) calls upon the Manufacturing Subsystem (45), which incorporates a Purchasing Subsystem (69) to meet PLM, particularly Resource and Collaboration constraints or specifications. (The Purchasing Subsystem may, for example, incorporate the knowledge that, when considered in isolation, Project 8's design may want to use Component A as it has the lowest price (5-ohm resistors from IDT Corporation) for the volume (15,000) envisioned by Project 8; but when considered in combination with Projects 6 and 7, which use 1,500,000 units of Component A' which is functionally equivalent (being a 5-ohm resistor), Component A' actually has a corporate-wide lower price from the higher volume from IBCheeper Corp.)

Figure 6:
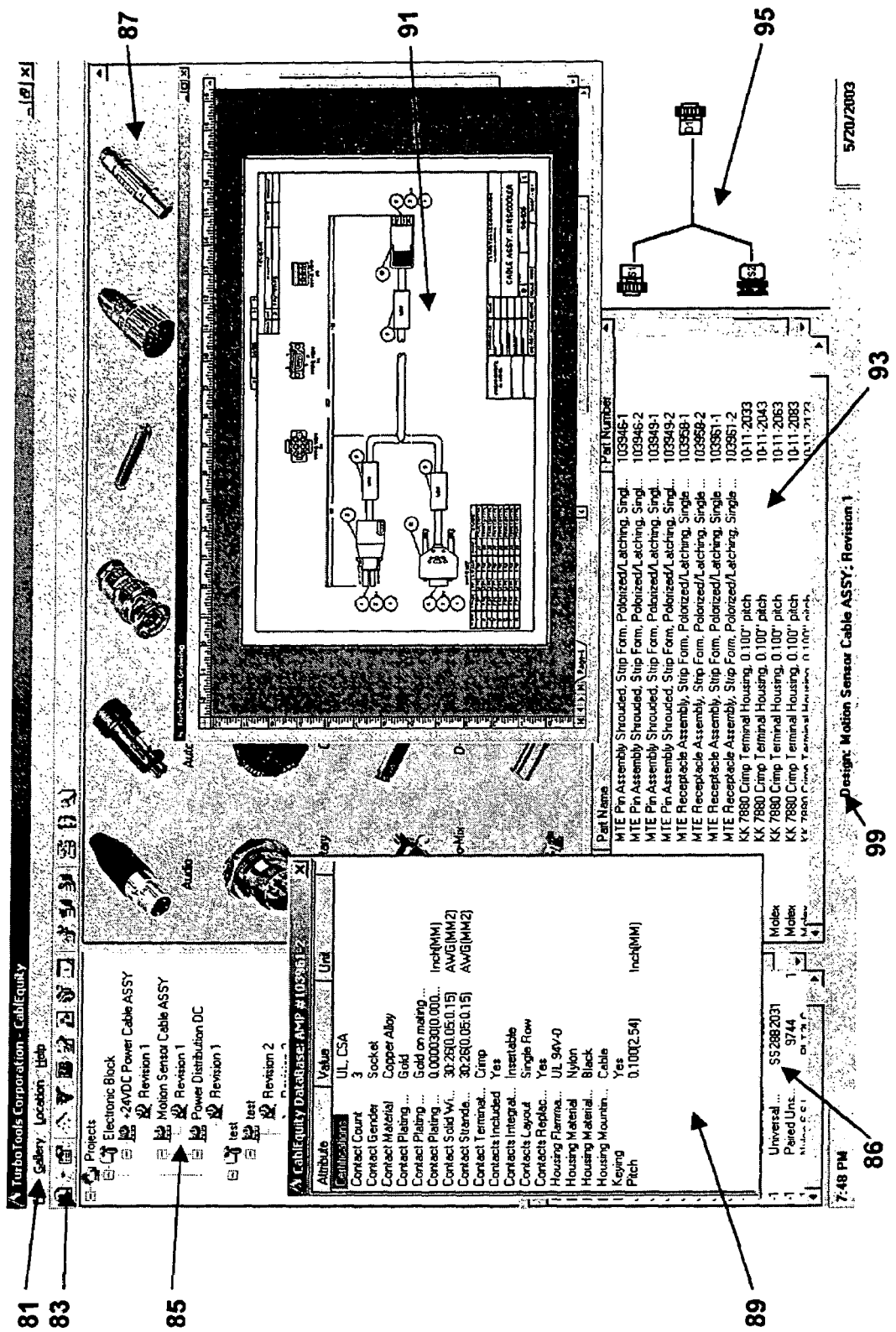
FIG. 6 shows a graphical image of a particular design instantiation using the best embodiment of the invention, where multiple, alternative, and current details relating to the project from the project status to the sub-element classification, from the selection possibilities of substantially equivalent sub-elements to the detailed manufacturer's specifications for the one currently chosen selection, are shown, along with the detailed and logically abstracted graphical representation of the assembly in its current state.

FIG. 6 shows a graphical image of a particular design instantiation using the best embodiment of the invention as it might appear on the display screen of a computer running software incorporating the method. In the background is an industry-standard, computing environment (81) with the overall program control menu and options. Also in the background is the currently active project, a toolbar of software operations available (83). On the upper-left can be seen a window where the overall project status, and current task option are displayed (85). In the middle background is a graphic representation of the current range of components from the component database which meet the design constraints previously entered available for selection (87). On the left-middle foreground is a display of the particulars of the currently selected component with each attribute and value known for that component (89). On the right-middle foreground is a display of the current assembly drawing for the overall design the project is working on (91). On the lower-middle-left background is a real-time listing of the current Bill of Materials for the design the project is working on (86). On the lower-middle background is a listing of the components of the type specified by the user available for selection and incorporation into the design (93) On the lower-right foreground is a real-time schematic, logical representation of the design the project is working on (95). At the bottom, center is the status bar with the current information for the active project and/or design (99). In one integrated display the status of the project and design, the component choices and placements; and the assembly and manufacturing related documentation, can be simultaneously reviewed and are continuously kept current with the user's determinations and selections.

Connections between components in a design for a product occur in many fields and come in many types, including electrical, fiber optic, pneumatic, hydraulic, fluid, and tension links. A part providing a functional connection (as opposed to one which merely physically affixes one part to another in a structure, which is a connection whose purpose has everything to do with external forces and little or no care with internal function of the combination) may also be called a connector. For example, a cable may both physically and functionally link a computer's disk drive to its main bus, or physically and functionally link a network router to an input/output port of a destination computer. A wire harness links multiple parts or may both support and link two parts, and thus may also be called a connector. And a system interconnect links more than one subordinate part (or subassembly) into a complete system, and thus may also be a connector. Although the preferred embodiment describes a tool and method that principally focuses on HES, this invention is not limited to such as the means and processes are usable with distinct data for the other types of products. Combinations of parts which care nothing about the internal functioning, and causal or logical connectivity of the subordinate structures, are not HES nor suitable for the software tool described herein.

The preferred embodiment of the present invention presently is focused on HES's and their design, and thus the electronic, telecommunications, and computer industries. However, there are multiple extensions to the preferred embodiment that are specific to particular alternate fields of manufacture. First among these are the medical and medical device industries, where connectors may be needed to proved the delivery linkages for in-patient surgical interventions, including the dropping-off of temporary or permanent supportive devices such as stents or timed-release delivery pumps; may be needed to support the guidance and control of investigative or extractive devices beyond direct human manipulation, such as endoscopic probes, cutters, or vacuums; or may be needed to support the guidance and control of operative mechanisms beyond direct human manipulation, such as in-vessel laser cauteries, inter-tissue drills, or intra-organ injections.

The design process for a HES includes at least the following steps: (1) specifying the input and output sought at each particular point; (2) specifying the design constraints for that particular HES (length, width, thickness, tensile strength, power capacity, resistance to interference, flexibility, color, etc.); (3) selecting all necessary components required to assemble said HES (the body, the attachment means for each internal component, the subassemblies, the means connecting all said pieces in the proper order, and transformation or transposition pieces, possibly existing as part of the specified linking part, that ensures the correct flow from each particular input at one end of the HES to each particular output at the other end of said HES); (4) obtaining a part number for each component; (5) obtaining a specification for each component; and, (6) testing said HES against all specified design constraints and against the input and output sought. The preferred embodiment of the present invention contains a set of libraries and supporting databases of components from which HES's can be designed, and guides the user through the design process, supporting each of steps (1) through (6). As a specific part of such guidance the user is empowered to specify the characteristics for each component and then select, from a set of components chosen from the database(s) and library(ies) by the program whose members are comprised of those components meeting such specifications, the particular component desired. By allowing a record of each HES to be maintained as a Project, the PLM-Supportive CAD-CAM Tool thereby creates and builds as 'knowledge capital' a library of designs, which, when tied to means for directly maintaining current and accurate information about third-party components and assemblages, will enable a more thorough, rapid, and re-usable design process for the users of the tool.

An extension to said preferred embodiment is a module that permits the user to specify simply the required attributes of a component and have the accessible data searched for all members meeting such attributes as a minimally-satisfying set of characteristics. This merger of data through the preferred embodiment's component and project databases, which are both used by a complex tool that understands all elements needing to be interconnected by a particular HES, and their relation to each other, as well as the design and manufacturing processes involved in creating said HES. The preferred embodiment of this invention permits physical information to be checked for accuracy using a Design Rule Check engine. An extension of this module permits the Design Rule Check to be customized according to the user's input and preferences.

As users' capabilities and experience may vary, but the minimal effective needs of the system being designed depend on the overall desired functionality, the preferred embodiment of the invention guides the engineer from designing the first subordinate component through the completion of a system-wide HES verification and testing, to the manufacturing documentation and change management for the lifecycle of each product. The preferred embodiment furthermore uses pre-loaded defaults for the first few HES setups. An extension to the preferred embodiment furthermore can include a module capable of learning new starting defaults based on the user's corrections or industrial field. An extension of the preferred embodiment that contains both such artificial intelligence features allows a user to be up and in production with little or no training, and ensures that the system will become more customized and more effective for the user the more it is used.

Design of any complex HES can be done from the general system down to the specific component (and interaction) details, or it can start from the specific details and work up to the general system. Since the individual assemblies or parts that are being combined can be seen as logical 'black boxes' whose internal details are irrelevant to the overall assemblage of the complex system, the present embodiment of the invention will work either way. The user may start from a system diagram and work down to the specific details for each of the components therein or, in the alternative, work out the specific details of the components and then combine them into one unified system design.

Unlike the invention disclosed in U.S. Pat. No. 5,822,206, Sebastian et. al., the present embodiment of the invention disclosed in this application does not and does not need to design any particular part, nor to design the tool to make such a part, nor to design the process to make such a part. It should be noted that in the paragraph of that patent's specification broadly describing the areas to which the authors considered it applicable, they did not mention either connectors nor the design of components within and for assemblages of subordinate components, where the important step is integrating the multiple components into the greater assemblage of the whole.

Unlike the approach detailed in Sebastian, et. al., which starts from 'primitive objects' with predetermined functions, the present embodiment of the invention disclosed in this application determines how to interconnect, logically and physically, preselected components, sub-assemblies, or external I/O points with particular specifications, working either from the bottom level of maximum physical detail up to the logical system description, of from the logical system description down to the bottom level of maximum physical detail. Moreover, for each connector which is required, the documentation required for the manufacturing process (engineering drawings, specifications, and bill of materials) is also generated, and the whole can be integrated into the manufacturing process using further information which, while it is not relevant to the physical or logical characteristics of the theoretical design and assemblage, may be critical to the commercial viability thereof, such as vendor-specific costs, availability, shipment time, inventory limitations, or contractual integrations. While the invention described in that patent is fine for the theoretical engineering model, it lacks crucial elements which can make a commercially valuable tool which are contained herein. Because of the insistence of integrating design of a part, the tool for the part, and the process for the part which is the core focus of that patent, it presumes that all parts must be re-invented each time, or at least by each manufacturer, and fails to adequately consider that re-use of prior designs, or use of external vendor parts, is a much more common reality within the increasingly integrated, global, manufacturing community. For most manufacturers, a cost estimator such as that contained in the present embodiment of the invention disclosed in this application (how much to buy this from Vendors A, B, and C?) is much more of a necessity than an economics estimator (how to trade off various approaches in tool design and machine configuration, manufacturing locale and choice of vendor against production requirements) such as that disclosed in Sebastian, et. al.

Because the design process may be interrupted, human designers can inadvertently create gaps or omit portions that were mentally not but actually completed. The preferred embodiment of this invention stores information both about the current completed state of the design process, and the minimal necessary steps required to complete it. The preferred embodiment further advises the user as to additional, and optional, tasks that become possible during the design process only when such are feasible, preventing mistaken assumption of completeness or 'jumping ahead on an uncompleted conclusion'.

An extension of the preferred embodiment helps engineers to revive, restore, and retain old HES designs by converting them from old (non-computer format) drawings or outdated bill of materials, to designs that can be reused in the future. A further extension uses the search function to locate available replacement components compatible with the required specifications, for those which are no longer available. A further extension performs the same function for outdated or existing HES's and designs, subject to the correct entry of the physical actuality. A further extension performs the same for outdated or existing HES diagrams.

Because any HES design is concerned with both the physical and logical (or causative) connections between assemblies and components contained within it, the preferred embodiment tracks both and uses both in evaluating the design process for completeness and correctness. This Automatic Physical and Logical Interconnect ('APLI') diagram, part of the preferred embodiment of the present invention, permits further extension. The preferred embodiment of the present invention enables generation of any proper set of connected assemblies that are functionally linked, thereby allowing all system and subsystem interconnection diagrams to be created automatically. Thus for an electrical computer system the power flow, core/peripheral interconnectivity, memory/bus/CPU interconnectivity, and I/O interconnectivity diagrams may all be generated by the preferred embodiment of the present invention.

Unlike the invention described in U.S. Pat. No. 4,638,442, Bryant, et. al., the present invention considers and manages both the logical interconnections and the physical requirements which are needed within and of the connecting means; and generates far more than a mere interconnection list which, in the absence of real-world considerations such as length, cladding, attachment means, or other physical characteristics of the connector, remains little more than a theoretical constraint on potential designs. While that invention may provide inputs which the present embodiment could use, the same input could be given by the system designer directly or from a library of previous designs successfully implemented and then only slightly moderated for the new system assembly.

The first extension to the above is the use of the APLI to track all signals across the entire system and checks for signals compatibility, thus eliminating potential mistakes in signal flows or improper mis-assignment of conflicting logical signal names to disparate physical signals. This extension keeps track of a wide variety of signals, including but not exhaustively limited to data, power, DC-noise sensitive, particular frequencies, and low- and high-speed data signals. A further extension to this module allows tracking of signals by logical as well as physical specifications (encoded, 'bursty', graphical vs. text, etc.).

A further extension to the preferred embodiment is the inclusion of a particular compatible database and/or library suitable to a particular industry, wherein said inclusion contains models, templates, or linkages to external existing systems, such that a user does not, for that industry, have to start their connector or systems interconnection design from a blank slate. A further extension to this extension permits the user to build and incorporate his own pre-designed, proprietary, compatible database and/or library to maximize his immediate particular value from the invention.

The manufacturing process for any HES includes at least the following steps: (1) preparing for said HES a bill of materials listing the number and quantity of parts, and the required minimally-satisfactory specifications for each part; and, (2) creating a drawing suitable for manufacture of said HES from its component parts. The design-for-manufacturing process may include (a) specifying a source, or a list of acceptable alternative sources, for each part comprising said HES; (b) identifying each said part by both the source (the part's manufacturer's) and destination (the HES's manufacturer) inventory control number; (c) logically testing a HES's design for completeness (all requisite parts included); (d) logically testing a HES's design for inefficiencies (unnecessary redundancies); and (e) logically testing a HES's design for inefficiencies (substitution of more efficient design by replacement of one subordinate set of components by another). The preferred embodiment of the present invention contains a set of libraries and supporting databases of components from which HES's can be designed that incorporate specifications, part numbers, and graphical representations, and provides the user with the support needed by the manufacturing process, supporting each of the steps outlined in (1) and (2).

Additional and optional extensions, which may be configured by the user to meet his particular needs in the design-for-manufacturing process, support each of the steps identified in (a) through (e). As part of said support, the preferred embodiment combines into an ordered structure the individual components, and their physical and logical linkages, for each product whose design is generated by the invention, and uses the same to automatically generate a complete and detailed bill of materials for that product. Also as part of said support, the preferred embodiment can draw from computer-accessible libraries and databases detailed specifications and previously-generated computer drawings for each component incorporated in a design generated by the invention, and use the same to automatically generate final drawings for the completed HES. Correct written documentation is even more vital when using off-shore or time-zone separated vendors that need to bridge languages and labor work hours with a maximum of correct communication and a minimum of manual re-entry of information.

In U.S. Pat. No. 4,875,162, Ferriter, et. al., a method for automated interfacing of a conceptual design tool with a project management tool is disclosed. Unlike the limited approach described therein, however, which does not assist with real-world implementation necessities, the present embodiment of the invention in this application produces both documentation critical to successful management and production (for example, engineering drawings and bills of material). Also, the present embodiment of the invention in this application can interact with current, real-world manufacturer's specifications contained and detailed outside the tool's own database, and interweave the inventory control and other component considerations (such as cost, availability, source or delivery constraints, or vendor characteristics) which may drive design and manufacturing decisions for each particular business using the present embodiment of the invention in this application.

An extension to the preferred embodiment will enable all of the necessary functionality for managing 'Enterprise Edition' control and generation information. This will include support for user generation, dissemination, emendation, tracking, and comparison of documents relevant to the users Engineering, document control, manufacturing, purchasing, procurement, inventory, and other management concerns.

The manufacturing process for a HES may also include or require the capacity to reverse-engineer a design from: (i) an existing, but not documented, physical specimen of a HES, in which the specimen is dissected into its component parts and the physical and logical specifics of each component part is fully tested and documented; or (ii) a detailed written description or drawing of a HES, optionally including a bill of materials thereof, wherein said written description or drawing is parsed into its component parts and the physical and logical specifics of each component part are matched to the overall functional specifications for said HES. As not all HES's are presently encoded in an electronically-recognizable format this function, while not necessary to the preferred embodiment of the invention, is nevertheless a valuable additional one. An extension to the preferred embodiment of the present invention contains software tools for supporting both steps (i) and (ii).

Similarly, the design process for a HES may start not from scratch but from an existing and nearly-satisfactory design. The preferred embodiment of the invention includes means for starting from a previously completed design for a HES and, by modifying at least one element therein, producing a distinct and distinguishable variation thereof, and then creating for said distinct and distinguishable variation all associated CAD-CAM documentation and processes, including the bill of materials, design drawing(s), and sourcing documentation.

A further extension of the present invention includes means for a user to enforce revision control on any design, with all supporting documentation automatically and specifically identified to its sourcing design and sourcing information, thereby allowing command, control, and feedback to be matched to and through the proper individuals and channels.

Additionally, as each new HES is produced, or as old ones are removed, or existing ones further specified or modified, the user may want to search for all current components and HES's available on the market meeting his specifications. In an effort to speed product design and development, design engineers use the Internet to try to find the specific details which enable them to select pre-existing components or assemblies which are the solution to their design needs. However, the 'Products' section on many sites often lacks the necessary details to make selection or buying decisions. In an extension to the preferred embodiment a list of potential components that are inadequately specified, and the precise information lacking for each such potential component on that list, is made available to minimize the further information search needed to determine whether each such particular component has the minimal necessary set of qualifications to meet the specification; and a Search and Cross-Reference Engine which allows attribute-driven, constraint-matching searches for potential and near matches (not just identical or absolutely conforming ones) to be made.

The more easily catalog information can be obtained at a source, the more engineers tend to return to that particular source. When searching Internet sites from vendors with similar product lines, engineers tend to revisit vendors' sites which are easy to navigate quickly. While product catalogs are often indexed, information available over the Internet from various component manufacturers often is not, or is inadequately specified for a particular user's needs. Moreover, the designer often needs to cross-compare multiple choices as they weigh design alternatives, choices which require comparing specifications from different manufacturers, who order their own information in their individualistic format and order. An extension to the preferred embodiment supports a search, and presentation of the results to the user, in a way that uses functional attributes of import to the user. A further extension makes the presentation and ordering of such functional attributes configurable by the user to his or her particular needs for emphasis and detail. In this way users need not first locate what, to the design, is meaningless information (such as the manufacturer's internal stock-keeping-unit or SKU number or product name). A still further extension to the preferred embodiment will link multiple component's suppliers' databases over the Internet. A still further extension will allow the user, not the database, to specify the ordering, language, or other translations necessary to transfer the functional information throughout the invention without requiring human intervention and avoiding the potential for error creeping in through manual input.

Using a PLM-supportive, CAD-CAM tool for a HES, such as that described in this specification, to design and manage the combination and connection of component subassemblies and parts into complex systems, generally will require the user to perform the following steps: (1) input into said PLM-supportive, CAD-CAM tool specifications for each HES's desired final design; (2) indicate all necessary supporting manufacturing process documentation for each subordinate element or sub-assembly, which generally will include: (a) a bill of materials for all components of said subordinate element or sub-assembly; and, (b) an engineering drawing for said subordinate element or sub-assembly, detailing each necessary further subordinate component or sub-sub-assembly thereof and indicating their combination; (both of which are automatically generated at the user's request in the preferred embodiment of the invention) and, (3) request said necessary supporting manufacturing process documentation be automatically generated by said PLM-supportive CAD-CAM tool; and, in the preferred embodiment, (4) use said PLM-supportive CAD-CAM tool for a HES over the Internet to obtain and manage the ordering, inventory, invoicing, manufactory, and delivery for said HES once said design has been completed. This method, which is new, not currently known within the art and not obvious to the practitioners, would greatly benefit the manufacturers, designers, purchasers, and even suppliers of connectors.

The preferred embodiment of the present invention includes a module containing an attributes-driven search engine, that the user can work with to locate a required component (including most complex electronic, mechanical, or optical parts) by simply specifying the attributes required for that particular component. An extension to this search engine allows cross-referencing by multiple attributes simultaneously.

A further extension of this module provides an intelligent list of participating manufacturers and distributors that carry a given component. A yet further extension to this module includes the capacity, once a component is located, of leading to or alternatively empowering direct, e-Commerce purchase of the located and desired component.

A further extension of the preferred embodiment of the present invention is a module that works backwards from a completed system interconnection diagram to design the complete, contained set of HES's comprising the linkages indicated between the assemblies in that system interconnection diagram. A further extension of this module uses heuristic, intelligent algorithms for weighting the design choices to meet a user-specified priority of design goals (e.g. costs before color, particular manufacturers favored over others, and finally minimizing susceptibility to self-interference over cost).

An extension to the preferred embodiment of the present invention ensures that, from a previous design created through use of this invention, any version modifying said design has appropriate identifying and tracking information for version control incorporated. A further extension to this module is that once the modifications are approved all drawings and bills of material are automatically corrected to reflect the latest changes. A further extension of this module ensures that the old versions are saved in a compressed file in the database and can be accessed anytime in the future. The advantages to these extensions include removing information or drawing lags between engineering, purchasing, sub contractors, manufacturing and customers, and preventing more orders for connectors that are already obsolete.

A further extension to this invention incorporates a comprehensive 'help' module which contains the materials and processes for accessing the same that enables differing levels of expertise on the parts of the users to find assistance with the areas they have not already mastered. This module incorporates: (a) an overview on how the PLM-Supportive, CAD-CAM tool (in the version and with the components mix currently being used) works; (b) a general engineering library with incorporated references and standards for consultation and review; (c) a glossary of terms; (d) a technical overview pertinent to the field(s) for the current HES being designed, cross-referenced to (a–c); (e) an overview of the current scientific theory also pertinent to the field(s) for the current HES being designed; and, (f) a compilation of the conventions, formulae, terminology (including slang), and standards for the field(s) for the current HES being designed.

Yet a further extension to the preceding extension is a tutorial module, which presents a set of design challenges, for each of which a solution set of possible answers, differentiating in quality, also exists, whereby the user may be challenged to respond to a known problem and then shown by comparison with previously-analyzed selections the strengths and weaknesses of his decisions and design.

The user interface to the preferred embodiment incorporates the following elements:

(A) a task selection panel, indicating the set of task steps that a user should select from at the current state of the process;
(B) a task completion record, indicating the last completed state of the process;
(C) means for hiding additional optional task steps that are not yet available at the current state of the process;
(D) means for revealing additional optional task steps that have become available at the current state of the process;
(E) means for functionally grouping potential parts that may be used at the current state of the process;
  (i) means for ordering a particular grouping, wherein said means may use either required or secondary and non-required characteristics of said potential parts, such means possibly including any of the non-exhaustive list of possible characteristics:
    (a) the part's cost;
    (b) the part's manufacturer;
    (c) the nationality of the part's manufacturer;
    (d) the part's color; or,
    (e) the material(s) of which the part is made;
  (ii) means for each user to configure said grouping; and,
  (iii) means for alternative displays of said grouping, including both as a textual list and as a graphical display;
(F) means for functionally grouping potential parts that may be used at the current state of the process that operate even when there exist incomplete specifications for at least one element contained in such group;
  (i) wherein said part or parts for which incomplete specifications exist are distinguishably denoted; or,
  (ii) wherein said part or parts for which incomplete specifications of secondary, non-required characteristics exist are distinguishably denoted with indications of the missing but presumed non-essential information;
(G) the capacity to display distinct, alternative, representations, both of task steps and of potential parts;
  (i) including in said capacity the further capacity to simultaneously display more than one distinct, alternative representation;
  (ii) including in said capacity as potential alternatives at least the options of both a graphical display and a text-based display;
  (iii) including in said capacity as potential alternatives at least two distinct graphical displays of the identical information; and,
  (iv) including in said capacity the ability to display both the information and the source of said information;
(H) means for the user to modify the information base on which the process operates based on the user's knowledge, potentially including as part of said means:
  (i) the ability to provide additional knowledge;
  (ii) the ability to change knowledge already present;
  (iii) the ability to delete knowledge already present;
  (iv) the ability to provide, in addition to any addition, modification, or deletion, the source verifying said addition, modification, or deletion;
  (v) the ability to provide a source-trace for any addition, modification, or deletion, including any of the following:
    (a) the person making the same;
    (b) the time the same was made;
    (c) the prior information replaced, if any;
    (d) the source verifying said prior information, if any; and,
    (e) the source-trace for said prior information, if any;
(I) for any modification of the information provided, means to translate from the format in which said modification is presented to the program to all representations thereof usable within said program, including:
  (a) text-to-graphical translation; and,
  (b) graphical-to-text translation;
(J) as an extension to the preferred embodiment, means for translating to and from any pre-specified integrative computer program format, such as the CAD-CAM design programs for the various assemblies whose connectors are the subject of this invention; and,
(K) as a further extension to the preferred embodiment, means for translating to and from any human language the supporting documentation, including specifically the detailed engineering specifications, design rules, or design considerations, created, accessed, located, changed, or otherwise accessed by this invention;
(L) differentiation amongst displays, in the preferred embodiment effected by iconic, visual cues, amongst the following six design and change statuses for any given product and task: (i) original; (ii) revision; (iii) current; (iv) manufacturing release (potentially dated with a range of dates); (v) engineering release (similarly, potentially dated with a range of dates); (vi) subject of a particular ECO; and, (vii) completed (but not released for manufacturing).

An extension to the user interface is multi-lingual capacity tied to the sourcing and produced information, permitting communication of engineering designs and decisions across linguistic barriers.

An extension to the user interface for the preferred embodiment incorporates standard 'browser' navigational and project management features for each connector design (e.g. copy, print, save, save as, open, import, and export commands). A further extension makes the particular set of features user-configurable and customizable. A yet further extension includes standard revision and user-control administrative tools (e.g. access control, security, encryption, non-exportation, decryption, authorization, automated release).

An extension to the preferred embodiment allows the conversion of existing user database information into the format used by the preferred embodiment, and a further extension allows the tracking of all additions and changes by automatic assignment of new components numbers.

An extension to the preferred embodiment allows the fabricated component(s) to be tested against the design specifications to measure the match between the computer design and the realization thereof. A further extension thereof permits the use of any available communication port, and generates the report of such a test (e.g. as a 'Cable Test and Failure Report') for each element and every interconnection thereof for an HES design.

A further extension to the above provides that if any component of an HES fails a test against a design specification, the tool will automatically analyze the consequences of each such failure, and any combination thereof, for the entire system. The tool will automatically analyze and notify which subsystem or a part of a system will not work, including the damage estimation, particular nature of the failure, and other test data. A still further extension will prioritize multiple failures to enable the most efficient use of limited resources for correction of the identified problems.

Though this invention can be used as a stand-alone PLM-supportive CAD-CAM tool on a single computer, the preferred embodiment in its best mode is a Web-based, PLM-supportive, CAD-CAM environment for HES, with modular support for functional needs and domain-specific knowledge databases, wherein individuals use a portal site to design, locate, and purchase design-related parts over the Internet, invoking those functional and knowledge modules and interacting with such third party programs that they need to coordinate best the design/test/manufacture/revise process. This embodiment is hereafter summarily described as the iEDC (Internet Engineering Design Center). To use this embodiment, rather than having to have every module they wish installed on their separate computers (systems), users can connect to the iEDC from any of their sourcing points (individual workstations, proprietary Local Area Network (LAN)/Wide Area Network (WAN) computer clusters, and independent computers) which are capable of managing both CAD-CAM detail and the associated data flows and representations. These combined capabilities will provide users of the preferred embodiment of this invention with a seamless method for going from existing CAD-CAM data on individual printed circuit boards, peripheral devices, CPUs, and electrical subassemblies, to the finished total HES designs and manufacturing-required documentation produced by the PLM-supportive, CAD-CAM tool.

This embodiment provides the following functionality: (1) comprehensive design automation support (using particular libraries for each design and manufacturing discipline involved); (2) an electronic search and cross-reference engine for finding and validating required components from databases, parts libraries, and on-line manufacturers' catalogs matching user-supplied design prerequisites to a set of parts each containing the minimally-satisfying specific characteristics; (3) listing the set of parts, potentially according to user-specified priorities (such as price, manufacturer, nationality of source, shipping time, or even color); (4) providing for each part in said set the full information available (beyond the minimally-satisfying characteristic guaranteed by its inclusion in said set), including real-time pricing and delivery schedules; (5) displaying a final assembly as specified in the design; (6) preparing a complete and correct bill of materials for said final assembly; (7) from the input, automatically preparing documentation, including all required assembly-ready engineering-quality drawings, for final assembly of the HES; (8) testing said HES for compliance with the specified requirements to ensure that, as long as the physical instantiation has been accurately described within the electronic map thereof, the function and purpose of the system sought will likewise be instantiated; and (9) integrating each particular HES with the rest of the user's operations, including other HES projects and non-engineering but business constraints and collaborative or cooperative efforts, including pricing, availability, scheduling, and interdependency information. This iEDC would put design engineers and manufacturers together on the same web page and become a portal for a complete design and manufacturing environment for every HES pursued or supported by the user, both at any particular time and over time.

An extension to the preferred embodiment is an analogous PLM-supportive, CAD-CAM tool specifically for designing fiber optic cable assemblies, and for related manufacturing and production documentation, procurement, and management efficiencies.

Another extension to the preferred embodiment is an analogous PLM-supportive, CAD-CAM tool specifically for designing pneumatics, hydraulics, or other fluid-control assemblies, and for related manufacturing and production documentation, procurement, and management efficiencies.

The scope of this invention includes any combination of the elements from the different embodiments disclosed in this specification, and is not limited to the specifics of the preferred embodiment or any of the alternative embodiments mentioned above. Individual user configurations and embodiments of this invention may contain all, or less than all, of the elements disclosed in the specification according to the needs and desires of that user. The claims stated herein should be read as including those elements which are not necessary to the invention yet are in the prior art and may be necessary to the overall function of that particular claim, and should be read as including, to the maximum extent permissible by law, known functional equivalents to the elements disclosed in the specification, even though those functional equivalents are not exhaustively detailed herein.

Although the present invention has been described chiefly in terms of the preferred embodiment, it is to be understood that the disclosure is not to be interpreted as limiting. Various alterations and modifications will no doubt become apparent to those skilled in the art after having read the above disclosure. Such modifications may involve other features which are already known in the trade for CAD-CAM tools, and which may be used instead of or in addition to features already described herein. The user-interface detailed herein is not limiting but instructive of the embodiment of the invention, and variations which are readily derived through programming or mathematical transformations which are standard or known to the appropriate art are not excluded by omission. Accordingly, it is intended that the appended claims are interpreted as covering all alterations and modifications as fall within the true spirit and scope of the invention in light of the prior art.

Additionally, although claims have been formulated in this application for particular combinations of modules and subordinate features, it should be understood that the scope of the disclosure of the present application also includes not only any single novel element or any novel combination of elements disclosed herein, either explicitly or implicitly, but also all possible combinations thereof, whether or not such is presently explicitly stated in a claim and whether or not said combination mitigates any or all of the same technical problems as does the present invention. The applicants hereby give notice that new claims may be formulated to such features and/or combinations of such features during the prosecution of the present application or of any further application derived therefrom.

We claim:

1. A CAD-CAM software program that supports Product Lifecycle Management embodied on a computer readable medium, which supports Product Lifecycle Management, said CAD-CAM software program comprising:
   current state information for at least one product and its design;
   decision and accountability information tracking each product and its design up through its current state;
   a Resource Management Subsystem;
   a Product Lifecycle Management database;
   a Collaboration Subsystem; and
   a Project Management subsystem further comprising:
      a Project database;
      a Component database;
      a Search and Cross Reference engine, operating in coordination with the Component database;
      a Component Data Management subsystem;
      an Auto Engineering Change Order subsystem;
      a Bill of Materials generator;
      a Design Subsystem, operating in coordination with the Component database, Search and Cross-Reference engine, Component Data Management subsystem, Auto Engineering Change Order subsystem, and Bill of Materials generator; and,
      a Manufacturing subsystem, which includes a Purchasing subsystem;
   wherein for each distinct project initiated by a human user said databases, engine, subsystem, generator, and Design Subsystem take inputs from at least one external source, exchange data with the human user and amongst each other, and in accordance with the decisions and constraints entered by the human user and contained within the CAD-CAM software program, produce as an output at least one design of at least one product and supporting documentation associated with said design, both design and documentation being as complete as said decisions and constraints allow.

2. A CAD-CAM software program that supports Product Lifecycle Management as in claim 1, wherein the Project database is a relational database which can track and make use of the relationships between and amongst the attributes of its data.

3. A CAD-CAM software program that supports Product Lifecycle Management as in claim 2, wherein the Project database tracks for each distinct project the design state, supporting materials state, current interaction, human user, and progress on any associated report, validation, verification, and documentation requirement, from inception through completion of that distinct project.

4. A CAD-CAM software program that supports Product Lifecycle Management as in claim 2, wherein the Component database is a relational database which can track and make use of the relationships between and amongst the attributes of its data.

5. A CAD-CAM software program that supports Product Lifecycle Management as in claim 4, wherein the Component database further comprises at least one library of components for a particular class of hardware wherein each component in said library of components is both currently available on the open market and has its attributes as they are specified by that component's manufacturer included in the database.

6. A CAD-CAM software program that supports Product Lifecycle Management as in claim 1, wherein the Search and Cross-Reference Engine further comprises:
   means using a constraint-based approach for rapid classification and identification of identical, similar and like components;
   means for reporting for display to the human user both:
      (a) all components matching the constraints provided to the Search and Cross-Reference Engine; and,
      (b) for each such component, the particulars contained in the databases of such component; and,
   mean for using a comparative description for each attribute and constraint rather than a component's manufacturer's description, to provide a unified standard of comparison across different manufacturers.

7. A CAD-CAM software program that supports Product Lifecycle Management as in claim 1, wherein Component Data Management subsystem further comprises:
   mean for cullecting, cullating, and managing the details for each and every component comprising a part of each design, whether said part be a single component, a sub-assembly of sub-components, or a sub-component;
   means for providing the current representation of the design to the human user in accordance with said human user's expressed desire, further comprising:
      means for providing a graphical representation;
      means for providing a textual representation;
      means for providing a list representation;
      means for providing a dependency-tree representation; and,
      means for providing any combination of the above,
   depending on the human user's desire for more or less detail concerning the current state of the design involving that component.

8. A CAD-CAM software program that supports Product Lifecycle Management claim 1, wherein the Auto Engineering Change Order subsystem further comprises:
   for each project and design:
      means for managing the documentation;
      means for tracking, for accountability purposes, the human sources for design changes as they are made; and,
      means for transferring a design and its associated documentation between a design group and a manufacturing group.

9. A CAD-CAM software program that supports Product Lifecycle Management as in claim 8, wherein the Auto Engineering Change Order subsystem further comprises:
   for each proposed change to an existing design:
      means for associating with such request an Engineering Change Request;
      means for translating each Engineering Change Request into design goals and constraints;
      means for assigning to each Engineering Change Request a unique identifier; and,
      means for associating with each Engineering Change Request an Engineering Change Order, tracks the request as it moves from initial instantiation to satisfaction through a new and completed design of the translated design goals and constraints; and,
   for temporary, interim, or automatic changes to a design, means for associating to that design a unique and accountable Deviation Authorization which can subsequently be reviewed by a human user.

10. A CAD-CAM software program that supports Product Lifecycle Management as in claim 1, wherein the Bill of Materials generator further comprises:
   the means for resolving a design into a complete and correct list of its components;
   means for associating with each differentiable component on such list its source, whether it is a unitary component in the design or an subassembly, whether it is singular and if not the number of identical components on the list, the source manufacturer's product number, user's product number;
   means for repeatedly invoking, through iteration or recursion, the above means for resolving a design into a complete and correct list of its components, for each component which is a subassembly; and,
   means for summing up, after all repeated invocations are completed, all complete and correct lists of components into a single, unified, non-duplicative, complete, and correct Bill of Materials for the design.

11. A CAD-CAM software program that support Product Lifecycle Management as in claim 1, wherein the Design Subsystem further comprises:
   a Design Rules Check engine;
   an Assembly Drawing generator;
   a Verification module;
   a Simulation module; and,
   a Testing subsystem;
wherein said generator, modules, and subsystem take inputs, exchange data, and produce outputs in accordance with the decisions entered by the human user and associated with a design being processed by said Design subsystem.

12. A CAD-CAM software program that support Product Lifecycle Management as in claim 11, wherein the Design Subsystem further comprises:
   means for taking input from any of a human user, another CAD, CAM, or CAD-CAM program, or Bill of Materials; and, means for translating said input into design goals and constraints into an optimized standard format used by the CAD-CAM software program.

13. A CAD-CAM software program that supports Product Lifecycle Management as in claim 11, wherein the Design Rules Check engine further comprises:
   means for comparing attributes against constraints;
   means for testing each design objective and constraint against both a set of design rules contained within any database accessed by the Design Subsystem, and all components contained in the design currently being processed by the CAD-CAM program; and,
   means for reporting the results of such testing back to the human user.

14. A CAD-CAM software program that support Product Lifecycle Management as in claim 11, wherein the Design Rules Check engine further comprises customization elements enabling a human user to order and constrain the outputs in accordance with the human user's preferences.

15. A CAD-CAM software program that support Product Lifecycle Management as in claim 11, wherein the Assembly Drawing generator further comprises:
- means for drawing each component of a design;
- means for drawing each connection established between each component of the design; and,
- means for drawing each connection necessary, yet not established, between any component of the design and an as-yet non-detailed element.

16. A CAD-CAM software program that support Product Lifecycle Management as in claim 11, wherein the Verification module further comprises:
- means for identifying potential sneak circuits in a design;
- means for reporting all said potential sneak circuits;
- means for classifying all said potential sneak circuits into the closest associated type; and,
- means for listing, for each potential sneak circuit, the topology and components related thereto.

17. A CAD-CAM software program that supports Product Lifecycle Management as in claim 16, wherein the Verification module further comprises:
- means for taking results from the Simulation module;
- means for analyzing consequences for the entire design from the results from the Simulation module;
- means for estimating the damage to the completed product from such consequences; and,
- means for displaying to the user (a) those components of the design which will not work properly, (b) the result of analyzing the consequences for the entire design from the results, and, (c) the damage estimates, for redesign and costing evaluation.

18. A CAD-CAM software program that support Product Lifecycle Management in claim 11, wherein the Simulation module further comprises:
- means for tracking all signals sent across the design's components;
- for comparing all inputs into and outputs from said design against the constraints of permissible, anticipated, and acceptable inputs and outputs; and,
- means for identifying problems and suggesting corrections thereto, including (a) noting duplication of supposedly unique identifiers and attaching to each duplicate an automatically generated alteration making it unique, (b) separating and reconnecting misconnected connections, (c) providing defaults for uncompleted connections, (d) identifying signal incompatibilities, and (e) providing a complete list of all failures to match constraints and all signal incompatibilities, organized by components and connections.

19. A CAD-CAM software program that support Product Lifecycle Management as in claim 11, wherein the Testing subsystem further comprises:
- means for connecting a product fabricated in accordance with the design to the computer running the CAD-CAM PLM software;
- means for connecting at least one external testing device to the computer running the CAD-CAM PLM software;
- means for comparing the performance of the connected product, in response to the external testing device running a specified test process, against the specifications, constraints, and design requirements in the program's databases; and,
- means for reporting the results of such comparison for each specified test process, including specifically for each tested specification, constraint, and design requirement the actual measurement obtained through the external testing device.

20. A CAD-CAM software program that support Product Lifecycle Management as in claim 19, wherein the Testing subsystem further comprises:
- means for translating a design into a connected series of states with associated constraints based on real-world, physical limitations of the materials specified in the design, then
- means for testing the actual behavior of the product in operation under different conditions specified by inputs identifying a particular state and its associated constraints and at least one additional test condition;
- means for generating as a test condition, for each input and test condition, the associated signals through the external testing device, and sending the same through the connected product;
- means for evaluating whether any particular state is rendered unreachable and whether any associated constraint is violated by said additional test condition; and,
- means for reporting that evaluation.

21. A CAD-CAM software program that support Product Lifecycle Management as in claim 1, wherein the Purchasing subsystem further comprises:
- an access path for a non-engineer human user;
- means for the non-engineer human user to access and use the Component Database and coordinated Search and Cross-Reference Engine to select, allocate, and buy all of a product's required components;
- a second access path for a design engineer human user to submit a purchasing request directly to a purchasing agent; and,
- means for automatic notification to a human user when a component arrives, said notification being identified by the product with which said component is associated.

22. A CAD-CAM software program that support Product Lifecycle Management as in claim 21, wherein the Manufacturing Subsystem further comprises:
- means for notifying a human user associated with documentation associated with a component when said documentation changes of such change; and,
- means for updating the databases to incorporate such documentation changes.

23. A CAD-CAM software program that support Product Lifecycle Management as in claim 22, wherein the Manufacturing Subsystem further comprises;
- means for taking inputs front and sending outputs to an external inventory management, financial cash-flow, or payment tracking program; and,
- means for automatically generating, tracking, and reporting e-Commerce purchasing orders for components for a design, in accordance with the authorization and other constraints on the human user and such programs.

24. A CAD-CAM software program that support Product Lifecycle Management as in claim 1, wherein the Manufacturing Subsystem further comprises:
- means for a human user to identify a particular component which must be changed in response to a real-world manufacturing necessity;
- means for invoking the Design Subsystem to:
    - invoke the Component database and Search and Cross-Reference engine to find potential alternative replacements;
    - display all potential alternative replacements to a human user;
    - for each potential alternative replacement selected by a human user, verify, simulate, and test the design where that potential alternative replacement is used as the replacement for the particular component which must be changed; and, report the results of such replacement to the human user; and means for generating Deviation Authorization for the replacement selected;

means for generating all associated documentation for the new design;

means for displaying all parent assemblies using that particular component which is to be replaced, from which the user would select those to be changed; and, generating, for each design which is changed, the new Bill of Materials, new Assembly drawings, and new associated documentation for the changed design, in all of which the data for the particular component being replaced, would be replaced by the replacement part's data.

25. A CAD-CAM software program that support Product Lifecycle Management as in claim 24, further comprising at least one template for a previously-created design for an HES.

26. A CAD-CAM software program that support Product Lifecycle Management as in claim 24, further comprising a user-supplied proprietary design database.

27. A CAD-CAM software program that support Product Lifecycle Management as in claim 1, further comprising:
means for identifying uncompleted components;
means for identifying uncompleted connections; and,
means for alerting a human user to such.

28. A CAD-CAM software program that support Product Lifecycle Management as in claim 1, further comprising a module enabling the human user to use the Search and Cross-Reference engine to substitute equivalent components from any of the program's databases for any component identified as no longer being available within the design constraints.

29. A CAD-CAM software program that support Product Lifecycle Management as in claim 1, further comprising a module for identifying and disabling any design in any of the program's databases containing a component which is no longer available and for which no acceptable replacement can be identified.

30. A CAD-CAM software program that support Product Lifecycle Management as in claim 1, further comprising an Automatic Physical and Logical Interconnect (APLI) module for joining any tuple of designs into a new combination.

31. A CAD-CAM software program that support Product Lifecycle Management as in claim 30, wherein the APLI module further comprises an element that tracks signals by both logical and physical specifications through the design interconnections.

32. A CAD-CAM software program that support Product Lifecycle Management as in claim 1, further comprising:
means for managing design generation information; and,
means for managing support for user generation, dissemination, emendation, tracking, and comparison of documents relevant to the users Engineering, document control, manufacturing, purchasing, procurement, inventory, and other management concerns.

33. A CAD-CAM software program that support Product Lifecycle Management as in claim 1, further comprising a module for supporting translation from a partial description of a product to a complete design, for a product which has a current physical instantiation but not an informational instantiation.

34. A CAD-CAM software program that support Product Lifecycle Management as in claim 1, further comprising:
means for randomly selecting a particular component and inducing a change therein;
means for assessing the effects of such change on the remainder of the design;
means for adapting the remainder of the design to such change; and,
means for comparing relative advantages and disadvantages between the previous and modified design.

35. A CAD-CAM software program that support Product Lifecycle Management as in claim 34, further comprising at least one rule for directing the selection of a particular component rather than settling for a random choice.

36. A CAD-CAM software program that support Product Lifecycle Management as in claim 1, further comprising a module enforcing revision control for each design, and subsequent changes, managed by the software program.

37. A CAD-CAM software program that support Product Lifecycle Management as in claim 1, further comprising:
means for connecting to the Internet;
means for searching across the Internet for all potential replacements for any component contained in any of the software program's databases; and,
means for reporting the possibility of such replacement to the human user.

38. A CAD-CAM software program that support Product Lifecycle Management as in claim 1, further comprising an extension to the Search and Cross-Reference engine that enables any search to use multiple attributes simultaneously.

39. A CAD-CAM software program that support Product Lifecycle Management as in claim 38, further comprising an extension enabling the human user to specify the relative order in which the attributes for potential replacements should determine desirability of the otherwise-equivalent potential replacements for a component.

40. A CAD-CAM software program that support Product Lifecycle Management as in claim 1, further comprising incorporated heuristic algorithms for sorting the potential components for a design in response to the importance given to the attributes by a human user.

41. A CAD-CAM software program that support Product Lifecycle Management as in claim 1, further comprising a module for taking a system interconnection diagram for a HES, and working backwards through the interconnections and component matchings, to generate a design for a product satisfying that system interconnection diagram.

42. A CAD-CAM software program that support Product Lifecycle Management as in claim 1, further comprising a user interface comprising:
(A) a task selection panel, indicating the set of task steps that a user should select from at the program's current state;
(B) a task completion record, indicating the last completed state of the program;
(C) means for hiding additional optional task steps that are not yet available at the current state of the program;
(D) means for revealing additional optional task steps that have become available at the current state of the program;
(E) means for functionally grouping potential components tat may be used at the current state of the program, including:
(i) means for ordering a particular grouping, wherein said means may use either required or secondary and non-required characteristics of said potential components, such means possibly including any of the non-exhaustive list of possible characteristics:
(a) the component's cost;
(b) the component's manufacturer;
(c) the nationality of the component's manufacturer;
(d) the component's color; or,
(e) the material(s) of which the component is made;
(ii) means for each user to configure said grouping; and,
(iii) means for alternative displays of said grouping, including both as a textual list and as a graphical display;
(F) means for functionally grouping potential component that may be used at the current state of the program that operate even when there exist incomplete specifications for at least one component contained in such group;
(i) wherein said component or components for which incomplete specifications exist arc distinguishably denoted; or,
(ii) wherein said component or components for which incomplete specifications of secondary, non-required characteristics exist are distinguishably denoted wit indications of the missing but presumed non-essential information;
(G) the capacity to display distinct, alternative, representations, both of task steps and of potential components;
(i) including in said capacity the further capacity to simultaneously display more than one distinct, alternative representation;
(ii) including in said capacity as potential alternatives at least the options of both a graphical display and a text-based display;
(iii) including in said capacity as potential alternatives at least two distinct graphical displays of the identical information; and,
(iv) including in said capacity the ability to display both the information and the source of said information;
(H) means for the user to modify the information base on which the program operates based on the user's knowledge, potentially including as part of said means:
(i) the ability to provide additional knowledge;
(ii) the ability to change knowledge already present;
(iii) the ability to delete knowledge already present;
(iv) tile ability to provide, in addition to any addition, modification, or deletion, the source verifying said addition, modification, or deletion;
(v) the ability to provide a source-trace for any addition, modification, or deletion, including any of the following:
(a) the person making the same;
(b) the time the same was made;
(c) the prior information replaced, if any;
(d) the source verifying said prior information, if any; and,
(e) the source-trace for said prior information, if any;
(I) for any modification of the information provided, means to translate from the format in which said modification is presented to the program to all representations thereof usable within said program, including:
(a) text-to-graphical translation; and,
(b) graphical-to-text translation;
(J) as an extension to the preferred embodiment, means for translating to and from any pre-specified integrative computer program format, such as the CAD-CAM design programs for the various assemblies whose connectors are the subject of this invention; and,
(K) as a further extension to the preferred embodiment, means for translating to and from any human language the supporting documentation, including specifically the detailed engineering specifications, design rules, or design considerations, created, accessed, located, changed, or otherwise accessed by this program.

* * * * *